(12) United States Patent
Ito

(10) Patent No.: US 6,697,081 B1
(45) Date of Patent: Feb. 24, 2004

(54) IMAGE PROCESSING METHOD AND DEVICE, AND STORAGE MEDIUM STORING A PROGRAM THEREFOR

(75) Inventor: Shuhei Ito, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 390 days.

(21) Appl. No.: 09/689,580

(22) Filed: Oct. 12, 2000

(30) Foreign Application Priority Data

Oct. 13, 1999 (JP) ............................................ 11-291608

(51) Int. Cl.⁷ .................................................. G09G 5/00
(52) U.S. Cl. ..................... 345/619; 345/653; 345/654; 345/679; 345/680; 382/295
(58) Field of Search ................................ 345/648, 653, 345/654, 679, 680

(56) References Cited

U.S. PATENT DOCUMENTS

| | | | | |
|---|---|---|---|---|
| 5,307,449 A | * | 4/1994 | Kelley et al. ................ | 345/419 |
| 5,428,725 A | * | 6/1995 | Sugai et al. ................. | 345/648 |
| 6,014,125 A | * | 1/2000 | Herbert ....................... | 345/660 |

* cited by examiner

*Primary Examiner*—Matthew C. Bella
*Assistant Examiner*—Antonio Caschera
(74) *Attorney, Agent, or Firm*—Pillsbury Winthrop LLP

(57) ABSTRACT

An image processing method is capable of generating an image containing graphics that are transformed without carrying out multiplying/dividing operations. Image data of a transformed graphic is generated from image data of a source graphic stored in an image memory, and also stored into a frame buffer. Coordinate values of points of the graphic being transformed are determined utilizing digital differential analysis (DDA) algorithm-based processes. Image data of a location specified by the horizontal and vertical coordinate values of each point on the source graphic is read out from the image memory, and written into the frame buffer as image data of each point on the horizontal line segment.

2 Claims, 18 Drawing Sheets

EXAMPLES OF 4 APEX-BASED TRANSFORMATION

EXAMPLES OF 3D GRAPHIC BY 4 APEX-BASED TRANSFORMATION

EXAMPLES OF FREE TRANSFORMATION

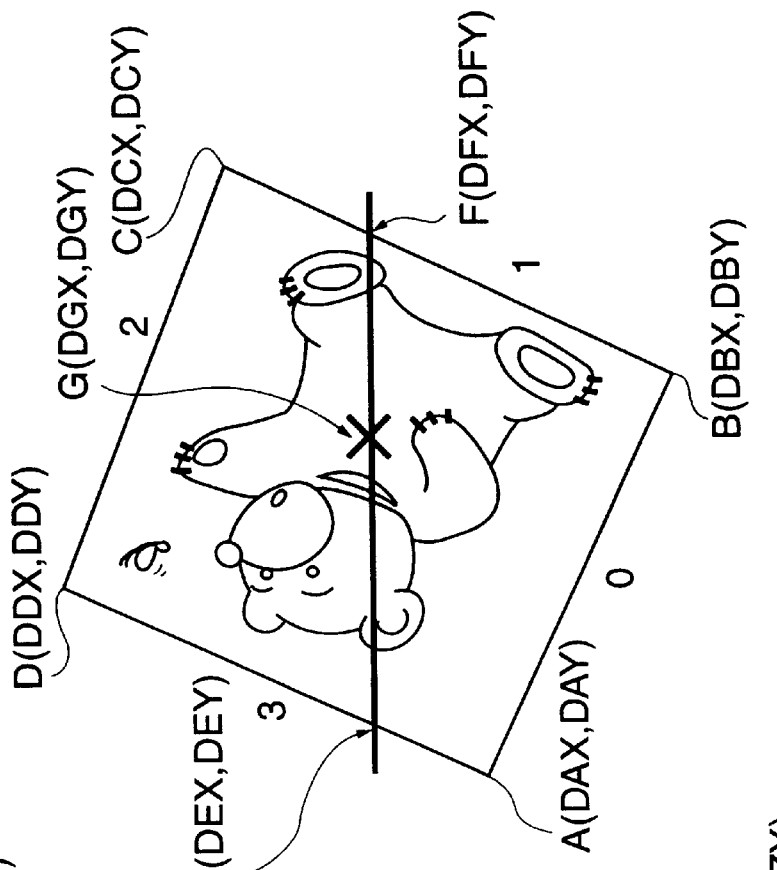
FIG. 4B TRANSFORMED SPRITE
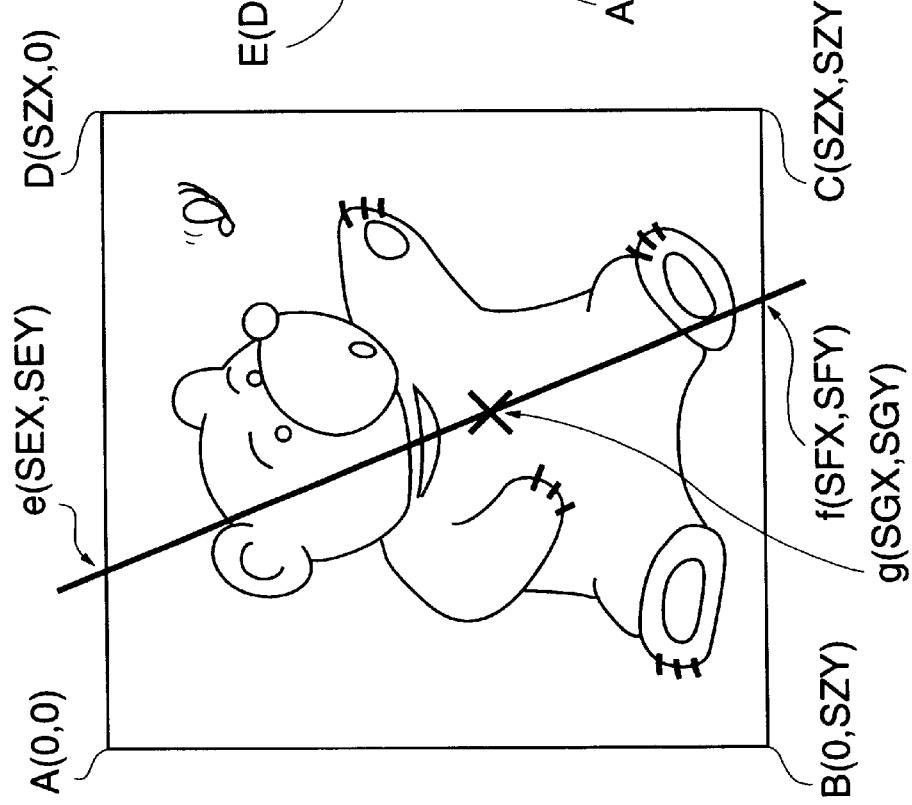
FIG. 4A SOURCE SPRITE

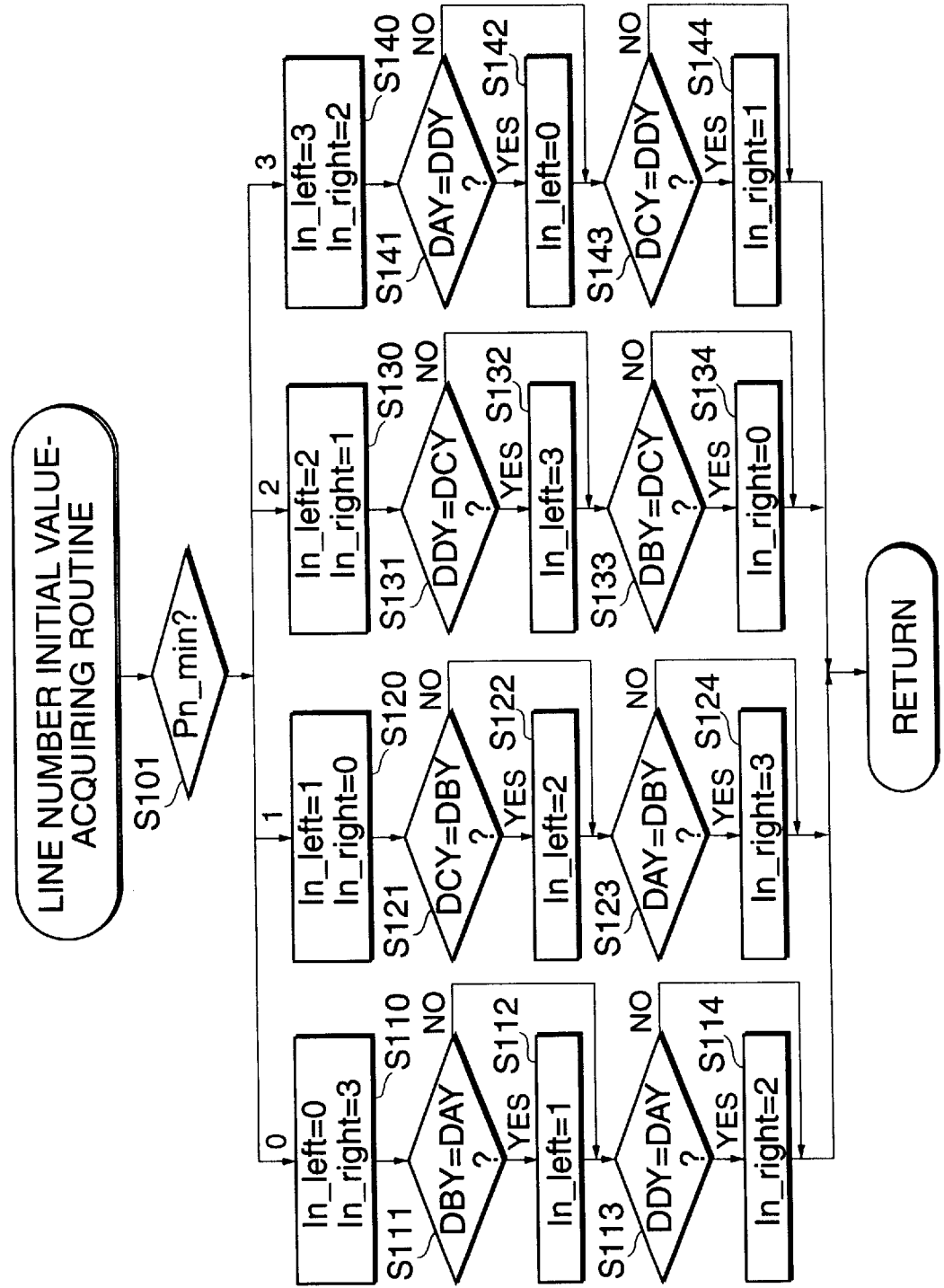

FIG.10A

| | (a0) | (a1) | (a2) |
|---|---|---|---|
| Pn_min=0 | | | |

FIG.10B

| | (a0) | (a1) | (a2) |
|---|---|---|---|
| Pn_min=1 | | | |

FIG.10C

| | (a0) | (a1) | (a2) |
|---|---|---|---|
| Pn_min=2 | | | |

FIG.10D

| | (a0) | (a1) | (a2) |
|---|---|---|---|
| Pn_min=3 | | | |

FIG.12

| In_left | INITIALIZE DDA | INITIALIZATION PARAMETER ||||
|---|---|---|---|---|---|
| | | xstart | ystart | xend | yend |
| 0 | DEX | DAX | DAY | DBX | DBY |
| | SEX | 0 | DAY | 0 | DBY |
| | SEY | 0 | DAY | SZY | DBY |
| 1 | DEX | DBX | DBY | DCX | DCY |
| | SEX | 0 | DBY | SZX | DCY |
| | SEY | SZY | DBY | SZY | DCY |
| 2 | DEX | DCX | DCY | DDX | DDY |
| | SEX | SZX | DCY | SZX | DDY |
| | SEY | SZY | DCY | 0 | DDY |
| 3 | DEX | DDX | DDY | DAX | DAY |
| | SEX | SZX | DDY | 0 | DAY |
| | SEY | 0 | DDY | 0 | DAY |

| In_right | INITIALIZE DDA | INITIALIZATION PARAMETER ||||
|---|---|---|---|---|---|
| | | xstart | ystart | xend | yend |
| 0 | DFX | DBX | DBY | DAX | DAY |
| | SFX | 0 | DBY | 0 | DAY |
| | SFY | SZY | DBY | 0 | DAY |
| 1 | DFX | DCX | DCY | DBX | DBY |
| | SFX | SZX | DCY | 0 | DBY |
| | SFY | SZY | DCY | SZY | DBY |
| 2 | DFX | DDX | DDY | DCX | DCY |
| | SFX | SZX | DDY | SZX | DCY |
| | SFY | 0 | DDY | SZY | DCY |
| 3 | DFX | DAX | DAY | DDX | DDY |
| | SFX | 0 | DAY | SZX | DDY |
| | SFY | 0 | DAY | 0 | DDY |

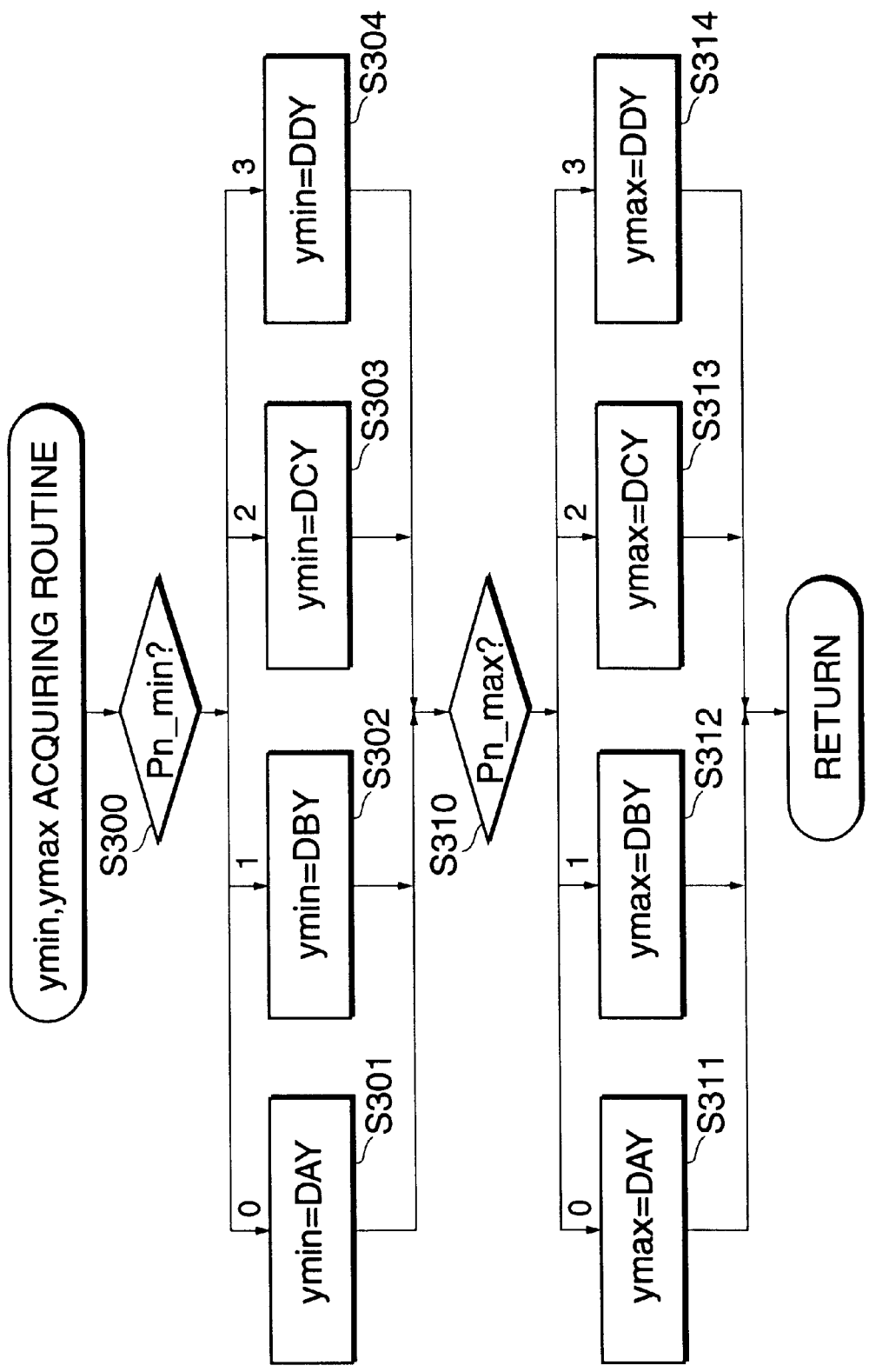

IMAGE PROCESSING METHOD AND DEVICE, AND STORAGE MEDIUM STORING A PROGRAM THEREFOR

BACKGROUND OF THE INVENTION

1. Field of the Invention

This invention relates to an image processing method and device for transforming an image of a graphic stored in an image memory and displaying the transformed image on a display device, and a storage medium storing a program therefor.

2. Prior Art

In video game machines and the like, a screen view is formed by reading image data of graphics necessary for forming respective parts of one screen view from an image memory storing image data of various graphics, generating write addresses corresponding to positions of the read image data of each graphic within the one screen view, and writing the image data of graphics in areas of a frame buffer corresponding to the respective write addresses. During the screen view formation, it is generally employed to rotate or transform a graphic or graphics in the screen view by controlling read addresses of the image data of the graphic or graphics stored in the image memory, and write addresses of the same in the frame buffer. This kind of technique is generally called "two-dimensional rendering". For the convenience of description, throughout the present specification, the term "transform (transformation)" is used in a broader sense than usual, i.e. as a general term for image-tranforming operations including not only transformation as its normal meaning but also rotation or the like. In the appended claims as well, the term "transform (transformation)" is used in the broader sense.

The two-dimensional rendering, referred to above, is generally implemented by steps of calculating transform functions for mapping positions of parts of a graphic subjected to transformation (post-transformation graphic) over corresponding positions of the same graphic before being subjected to transformation (pre-transformation graphic), converting, using the transform functions, the positions of the parts of the graphic subjected to transformation on a display screen view to corresponding positions of the pre-transformation graphic, and reading image data corresponding to the positions of the pre-transformation graphic from the image memory. However, the above transform functions for use in the two-dimensional rendering include multiplications and divisions. Therefore, a VDP (video decompression processor) designed for the two-dimensional rendering is required to perform high-speed multiplying/dividing operations, resulting in an increased manufacturing cost of the VDP.

SUMMARY OF THE INVENTION

It is an object of the present invention to provide an image processing method that is capable of generating an image containing graphics which are transformed without carrying out multiplying/dividing operations, an image processing device for implementing the image processing method, and a storage medium storing a program for executing the image processing method.

To attain the above object, according to a first aspect of the invention, there is provided an image processing method of generating image data of a transformed graphic from image data of a source graphic before transformation stored in an image memory, and storing the image data of the transformed graphic into a frame buffer.

The method according to the first aspect of the invention is characterized by comprising the steps of sequentially determining, by a first DDA algorithm-based process, horizontal coordinate values of a pair of first points of intersection where a horizontal scanline intersects with two of sides defining the transformed graphic, while advancing the horizontal scanline in a vertical direction by a unit amount; sequentially determining, by a second DDA algorithm-based process, horizontal coordinate values and vertical coordinate values of a pair of second points of intersection on sides of the source graphic corresponding respectively to the two of the sides defining the transformed graphic, the second points of intersection corresponding respectively to the first points of intersection; determining, by a third DDA algorithm-based process, a horizontal coordinate value and a vertical coordinate value of each of points on the source graphic corresponding to respective points on a horizontal line segment connecting between one and another of the first points and spaced from each other by the unit amount, the respective points being obtained by changing a horizontal coordinate from a horizontal coordinate value of the one of the first points to a horizontal coordinate value of the another of the first points by the unit amount, whenever the first DDA algorithm-based process and the second DDA algorithm-based process are executed; and reading out image data of a location specified by the horizontal coordinate value and the vertical coordinate value of the each of the points on the source graphic determined by the third DDA algorithm-based process, from the image memory, and writing the read out image data into the frame buffer as image data of each of the respective points on the horizontal line segment connecting between the one and the another of the first points on the transformed graphic and spaced from each other by the unit amount.

Preferably, the first DDA algorithm-based process to the third DDA algorithm-based process are based on a DDA algorithm based process for sequentially determining one of a pair of integer coordinate values corresponding to each of straight line-approximating ones of lattice points of a two-dimensional coordinate system as a second integer coordinate value in response to inputting of a first integer coordinate value corresponding to the one of the pair of integer coordinate values, the two-dimensional coordinate system having a first coordinate axis for specifying a first coordinate value and a second coordinate axis for specifying a second coordinate value, each of the lattice points being specified by an integer as the first coordinate value and an integer as the second coordinate value, the straight line-approximating ones approximating a straight line arranged in the two-dimensional coordinate system, wherein if a first numerical value corresponding to a length of the straight line along the first coordinate axis is larger than or not smaller than a second numerical value corresponding to a length of the straight line along the second coordinate axis, the first numerical value is accumulated whenever the first integer coordinate value is changed by a unit amount, and accumulation of the second numerical value and change of the second integer coordinate value by the unit amount are repeatedly carried out to update the second integer coordinate value each time such that the second integer coordinate value becomes farther from an initial value of the second integer coordinate value corresponding to one end of the straight line and becomes closer to a final value of the second integer coordinate value corresponding to another end of the straight line until the accumulated second numerical value exceeds the accumulated first numerical value, whereas if the first numerical value corresponding to the length of the straight line along the first coordinate axis is not larger than or smaller than the second numerical value corresponding to the length of the straight line along the second coordinate axis, the second numerical value is accumulated whenever the first integer coordinate value is changed by the unit amount, and accumulation of the first numerical value and change of the second integer coordinate value by the unit amount are repeatedly carried out to update the second integer coordinate value each time such that the second integer coordinate value becomes farther from the initial value of the second integer coordinate value corresponding to the one end of the straight line and becomes closer to the final value of the second integer coordinate value corresponding to the another end of the straight line until the accumulated first numerical value exceeds the accumulated second numerical value.

To attain the above object, according to a second aspect of the invention, there is provided an image processing method of generating image data of a transformed graphic from image data of a source graphic before transformation from an image memory, and storing the image data of the transformed graphic into a frame buffer.

The method according to the second aspect of the invention is characterized by executing a DDA algorithm-based process for sequentially determining one of a pair of integer coordinate values corresponding to each of straight line-approximating ones of lattice points of a two-dimensional coordinate system as a second integer coordinate value in response to inputting of a first integer coordinate value corresponding to the one of the pair of integer coordinate values, the two-dimensional coordinate system having a first coordinate axis for specifying a first coordinate value and a second coordinate axis for specifying a second coordinate value, each of the lattice points being specified by an integer as the first coordinate value and an integer as second, coordinate value, the straight line-approximating ones approximating a straight line arranged in the two-dimensional coordinate system, wherein if a first numerical value corresponding to a length of the straight line along the first coordinate axis is larger than or not smaller than a second numerical value corresponding to a length of the straight line along the second coordinate axis, the first numerical value is accumulated whenever the first integer coordinate value is changed by a unit amount, and accumulation of the second numerical value and a change of the second integer coordinate value by the unit amount are repeatedly carried out to update the second integer coordinate value each time such that the second integer coordinate value becomes farther from an initial value of the second integer coordinate value corresponding to one end of the straight line and becomes closer to a final value of the second integer coordinate value corresponding to another end of the straight line until the accumulated second numerical value exceeds the accumulated first numerical value, whereas if the first numerical value corresponding to the length of the straight line along the first coordinate axis is not larger than or smaller than the second numerical value corresponding to the length of the straight line along the second coordinate axis, the second numerical value is accumulated whenever the first integer coordinate value is changed by the unit amount, and accumulation of the first numerical value and change of the second integer coordinate value by the unit amount are repeatedly carried out to update the second integer coordinate value each time such that the second integer coordinate value becomes farther from the initial value of the second integer coordinate value corresponding to the one end of the straight line and becomes closer to the final value of the second integer coordinate value corresponding to the another end of the straight line until the accumulated first numerical value exceeds the accumulated second numerical value; and by comprising the steps of executing a transformed graphic intersection coordinate value-calculating process for sequentially carrying out the DDA algorithm-based process on each of two of sides defining the transformed graphic, with which a horizontal scanline intersects when it is moved vertically, with one of two ends of the each of the two of the sides which is first reached by the horizontal scanline set to a first starting point, another of the two ends set to a first ending point, a horizontal coordinate value of the first starting point set to the initial value of the second integer coordinate value used in the DDA algorithm-based process, a horizontal coordinate value of the first ending point set to the final value of the second integer coordinate value corresponding to the another end of the straight line used in the DDA algorithm-based process, and a vertical coordinate value defining the horizontal scanline set to the first integer coordinate value used in the DDA algorithm-based process, to thereby obtain the second integer coordinate value as a horizontal coordinate value of a corresponding one of a pair of first points of intersection where the horizontal scanline intersects with the two sides; executing a first source graphic intersection coordinate value-calculating process for sequentially carrying out the DDA algorithm-based process on one of sides defining the source graphic corresponding to the each of the two of the sides defining the transformed graphic, with a horizontal coordinate value of one end of the one of the sides defining the source graphic corresponding to the first starting point set to the initial value of the second integer coordinate value used in the DDA algorithm-based process, a horizontal coordinate value of another end of the one of the sides defining the source graphic corresponding to the first ending point set to the final value of the second integer coordinate value used in the DDA algorithm-based process, and the vertical coordinate value defining the horizontal scanline set to the first integer coordinate, to thereby obtain the second integer coordinate value as a horizontal coordinate value of a corresponding one of a pair of second points of intersection on the source graphic corresponding respectively to the pair of first points of intersection; executing a second source graphic intersection coordinate value-calculating process for sequentially carrying out the DDA algorithm-based process on the one of the sides defining the source graphic, with a vertical coordinate value of the one end of the one of the sides defining the source graphic corresponding to the first starting point set to the initial value of the second integer coordinate value used in the DDA algorithm-based process, a vertical coordinate value of the another end of the one of the sides defining the source graphic corresponding to the first ending point set to the final value of the second integer coordinate value used in the DDA algorithm-based process, and the vertical coordinate value defining the horizontal scanline set to the first integer coordinate value, to thereby obtain the second integer coordinate value as a vertical coordinate value of the corresponding one of the pair of second points of intersection on the source graphic corresponding respectively to the pair of first points of intersection; executing a horizontal coordinate value-calculating process for repeatedly carrying out the DDA algorithm-based process whenever the transformed graphic coordinate value-calculating process, the first source graphic coordinate value-calculating process, and the second source graphic coordinate value-calculating process are carried out one time, with a horizontal coordinate value of one of the pair of second points of intersection corresponding to one of the two sides defining the transformed graphic set to the initial value of the second integer coordinate value used in the DDA algorithm-based process, a horizontal coordinate value of another of the pair of second points of intersection corresponding to another of the two sides defining the transformed graphic set to the final value of the second integer coordinate value, and each of integer horizontal coordinate values on a horizontal line segment connecting between the pair of first points of intersection on the two sides defining the transformed graphic set to the first integer coordinate value used in the DDA algorithm-based process, to thereby obtain the second integer coordinate value as a horizontal coordinate value of each of points on the source graphic corresponding to respective points on the horizontal line segment spaced from each other by the unit amount; executing a vertical coordinate value-calculating process for repeatedly carrying out the DDA algorithm-based process whenever the transformed graphic coordinate value-calculating process, the first source graphic coordinate value-calculating process, and the second source graphic coordinate value-calculating process are carried out one time, with a vertical coordinate value of the one of the pair of second points of intersection corresponding to the one of the two sides defining the transformed graphic set to the initial value of the second integer coordinate value used in the DDA algorithm-based process, a vertical coordinate value of the another of the pair of second points of intersection corresponding to the another of the two sides defining the transformed graphic set to the final value of the second integer coordinate value, and the each of integer horizontal coordinate values on the horizontal line segment connecting between the pair of first points of intersection on the two sides defining the transformed graphic set to the first integer coordinate value used in the DDA algorithm-based process, to thereby obtain the second integer coordinate value as a vertical coordinate value of the each of the points on the source graphic corresponding to the respective points on the horizontal line segment spaced from each other by the unit amount; and reading out a portion of the image data of the source graphic from a location within the image memory specified by the horizontal coordinate value obtained by the horizontal coordinate value-calculating process and the vertical coordinate value obtained by the vertical coordinate value-calculating process, for the each of the respective points on the horizontal line segment, and storing the read out portion of the image data in the frame buffer as image data of the transformed graphic corresponding to the each of the respective points on the horizontal line segment.

To attain the above object, according to a third aspect of the invention, there is provided an image processing device comprising an image memory that stores image data of a source graphic before transformation; a frame buffer that stores image data of a transformed graphic after the transformation generated from the source graphic by transforming the source graphic; a first DDA process section that sequentially determines, by a first DDA algorithm-based process, horizontal coordinate values of a pair of first points of intersection where a horizontal scanline intersects with two of sides defining the transformed graphic, while advancing the horizontal scanline in a vertical direction by a unit amount; a second DDA process section that sequentially determines, by a second DDA algorithm-based process, horizontal coordinate values and vertical coordinate values of a pair of second points of intersection on sides of the source graphic corresponding respectively to the two of the sides defining the transformed graphic, the second points of intersection corresponding respectively to the first points of intersection; a third DDA process section that determines, by a third DDA algorithm-based process, a horizontal coordinate value and a vertical coordinate value of each of points on the source graphic corresponding to respective points on a horizontal line segment connecting between one and another of the first points and spaced from each other by the unit amount, the respective points being obtained by changing a horizontal coordinate from a horizontal coordinate value of the one of the first points to a horizontal coordinate value of the another of the first points in the unit amount, whenever the first DDA algorithm-based process and the second DDA algorithm-based process are executed; and a data read/write process section that reads out image data of a location specified by the horizontal coordinate value and the vertical coordinate value of the each of the points on the source graphic determined by the third DDA algorithm-based process, from the image memory, and writes the read out image data into the frame buffer as image data of each of the respective points-on the horizontal line segment connecting between the one and the another of the first points on the transformed graphic and spaced from each other by the unit amount.

To attain the above object, according to a fourth aspect of the invention, there is provided a storage medium storing a program that can be executed by a computer, the program being capable of realizing a image processing method of generating image data of a transformed graphic based on image data of a source graphic before transformation from an image memory, and storing the image data of the transformed graphic into a frame buffer.

The storage medium according to the fourth aspect of the invention is characterized in the the program comprising a module for sequentially determining, by a first DDA algorithm-based process, horizontal coordinate values of a pair of first points of intersection where a horizontal scanline intersects with two of sides defining the transformed graphic, while advancing the horizontal scanline in a vertical direction in unit amounts; a module for sequentially determining, by a second DDA algorithm-based process, horizontal coordinate values and vertical coordinate values of a pair of second points of intersection on sides of the source graphic corresponding respectively to the two of the sides defining the transformed graphic, the second points of intersection corresponding respectively to the first points of intersection;

a module for determining, by a third DDA algorithm-based process, a horizontal coordinate value and a vertical coordinate value of each of points on the source graphic corresponding to respective points on a horizontal line segment connecting between one and another of the first points and spaced from each other by the unit amount, the respective points being obtained by changing a horizontal coordinate from a horizontal coordinate value of the one of the first points to a horizontal coordinate value of the another of the first points in the unit amount, whenever the first DDA algorithm-based process and the second DDA algorithm-based process are executed; and a module for reading out image data of a location specified by the horizontal coordinate value and the vertical coordinate value of the each of the points on the source graphic determined by the third DDA algorithm-based process, from the image memory, and writing the read out image data into the frame buffer as image data of each of the respective points on the horizontal line segment connecting between the one and the another of the first points on the transformed graphic and spaced from each other by the unit amount.

The above and other objects, features, and advantages of the invention will become more apparent from the following detailed description taken in conjunction with the accompanying drawings.

BRIEF DESCRIPTION OF THE DRAWINGS

FIG. 4A is a diagram showing an example of a source sprite to be subjected to a sprite-drawing process including a transformation step;

FIG. 4B is a diagram showing an example of a transformed sprite having been subjected to the sprite-drawing process;

FIG. 8 is a flowchart showing a line number initial value-acquiring routine executed by the FIG. 3 VDP;

FIGS. 10A to 10D are diagrams showing the contents of operations according to the line number acquisition processing routine executed by the FIG. 3 VDP;

FIG. 12 is a diagram showing conditions for the DDA initialization in FIG. 11;

FIG. 14 is a flowchart showing a ymin/ymax acquisition processing routine executed by the FIG. 3 VDP;

DETAILED DESCRIPTION OF PREFERRED EMBODIMENT

The present invention will now be described in detail with reference to drawings showing a preferred embodiment thereof.

An embodiment of the present invention that will be described in the following is given only by way of example, but by no means intended to limit the scope of the invention. The present invention can be modified and altered as desired without departing from the scope thereof.

A. Arrangement of Present Embodiment (1) Whole Arrangement of Motion Picture Display System FIG. 1 is a block diagram showing the arrangement of a motion picture display system to which is applied a VDP (video decompression processor) 100 according to an embodiment of the present invention.

Figure 1:
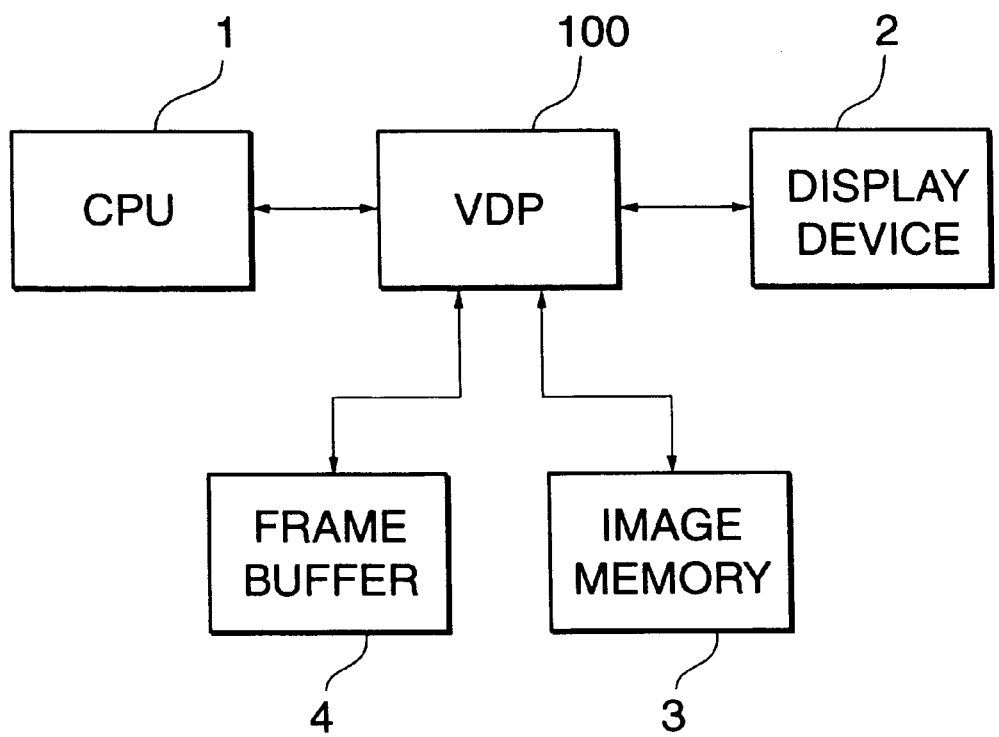
FIG. 1 is a block diagram showing the whole arrangement of a motion picture display system which uses a VDP according to an embodiment of the present invention.

In FIG. 1, an image memory 3 stores image data of various sprites and patterns. Here, the term "sprites" are used to mean images, such as characters which are moved on a screen. Each sprite used in the present embodiment has a rectangular outer shape. Image data of rectangular sprites are stored in the image memory 3. Further, the term "patterns" are used to mean images of backgrounds of the sprites. The sprites and patterns thus defined correspond to the components of the screen view, referred to hereinabove.

A frame buffer 4 is used for forming a sprite screen view having one or more sprites arranged therein. The VDP 100 manages values of attributes, such as display positions, display modes, and color calculation coefficients, of sprites and patterns stored in the image memory 3. The VDP 100 refers to these sprites and patterns, forms image data to be displayed as one screen view, by using sprites and patterns required to form the screen view, and supplies the image data thus formed to a display device 2 in synchronism with a synchronization signal. Further, the VDP 100 updates the attribute values of the sprites and patterns in accordance with requests from a CPU 1.

The VDP 100 according to the present embodiment is capable of writing image data of sprites stored in the image memory 3 into the frame buffer 4 as they are, i.e. without subjecting the same to transformation. The VDP 100 is also capable of writing image data of transformed ones of the sprites, into the frame buffer 4. Thus, a variety of various sprite screen views can be formed for display.

Figure 2A:
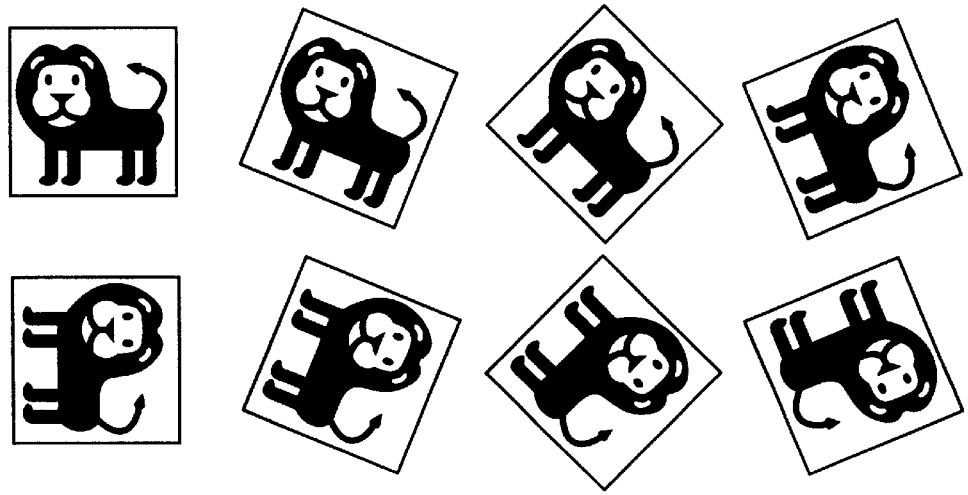
FIGS. 2A to 2C are diagrams illustrating examples of sprite images which are stored in a frame buffer employed in the embodiment.
Figure 2B:
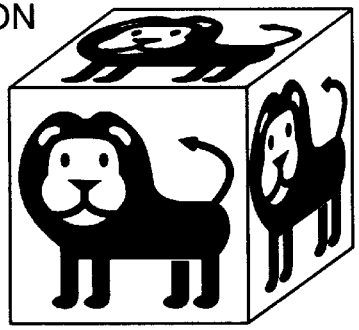
Figure 2C:
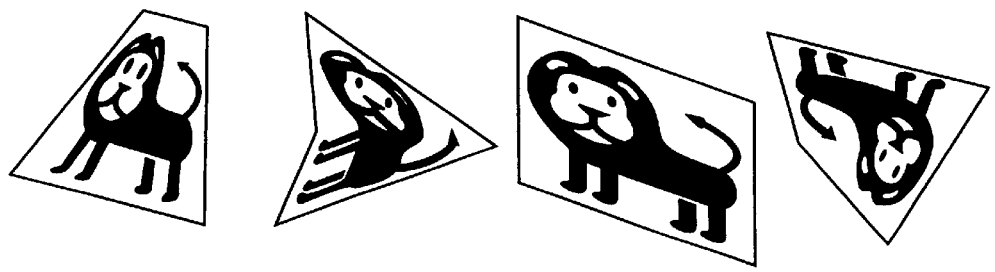

FIGS. 2A to 2C show examples of sprites displayed by the VDP of the present embodiment. A sprite shown in the upper left corner of FIG. 2A is one read out from the image memory 3, and displayed without being rotated or transformed. The other sprites in FIG. 2A are shown as being rotated relative to the original image stored in the image memory 3 through respective different angles.

In an example shown in FIG. 2B, a single sprite is transformed in various manners, and the resulting images are displayed in combination with each other for 3-dimensional representation. In each example shown in FIG. 2C, a sprite is freely transformed. Such transformations of a sprite are carried out when the VDP 100 transfers sprite image data from the image memory 3 to the frame buffer 4.

(2) Arrangement of VDP 100

Figure 3:
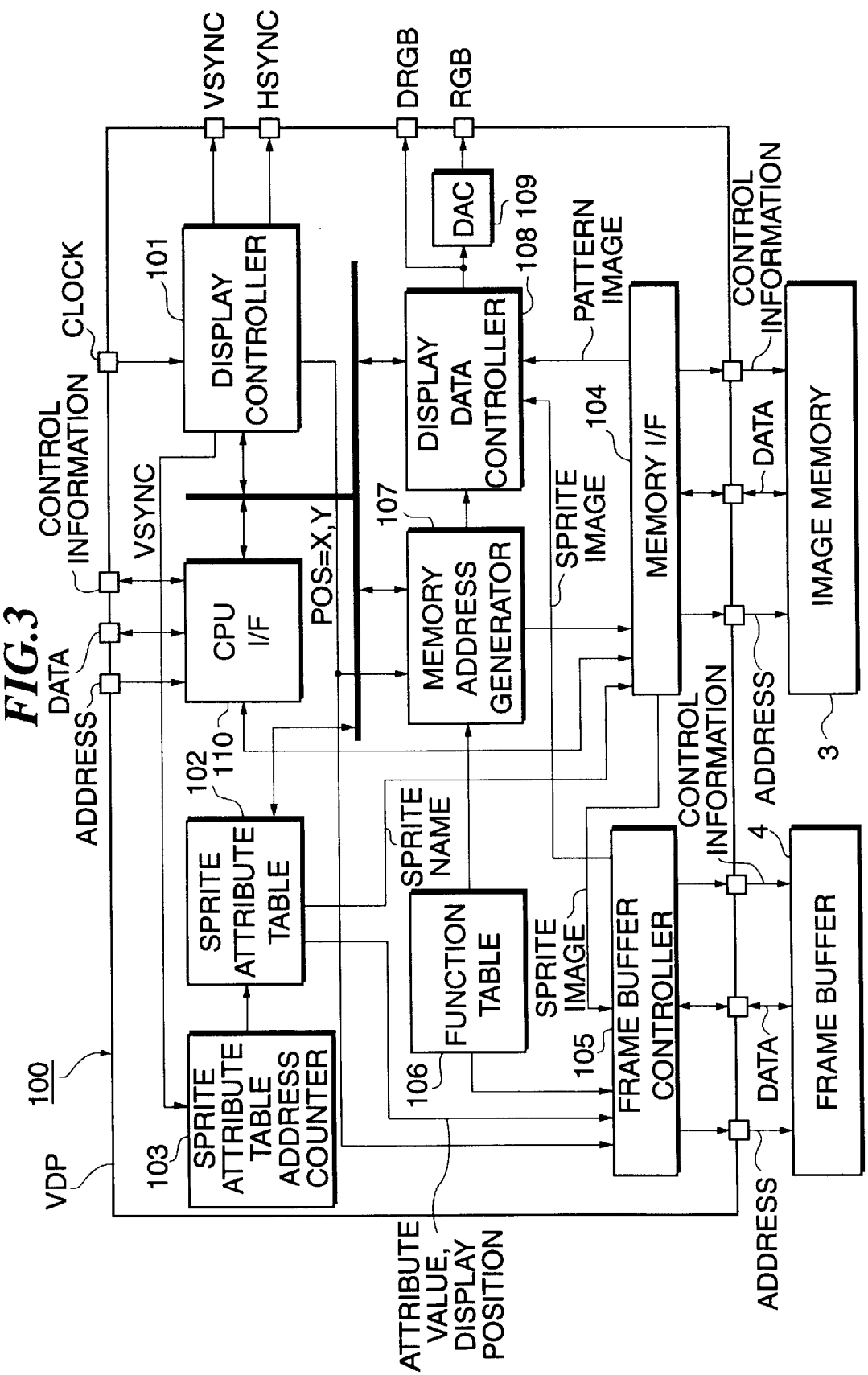
FIG. 3 is a block diagram showing the arrangement of the VDP according to the embodiment.

FIG. 3 shows the arrangement of the VDP 100 of the present embodiment. It should be noted that for the sake of understanding, the component parts and elements of the VDP 100 are shown together with the image memory 3 and the frame buffer 4.

In the following, the arrangement of the VDP 100 of the present embodiment will be described in detail with reference to FIG. 3.

First, a display controller 101 divides a clock having a predetermined frequency, provided by the CPU 1 and generates a horizontal synchronization signal HSYNC and a vertical synchronization signal VSYNC. The horizontal synchronization signal HSYNC and the vertical synchronization signal VSYNC are supplied to the display device 2 outside the VDP 100. Further, the vertical synchronization signal VSYNC is also supplied to a sprite attribute table address counter 103.

A sprite attribute table 102 stores values of attributes, such as a sprite title, and a display position (X and Y coordinate values) in the display device 2, of each sprite to be displayed on the display device 2. These attribute values include ones which are referred to when sprites are transformed to form a sprite screen view.

Now, attribute values related to the transformation of sprites will be described with reference to FIGS. 4A and 4B.

FIG. 4A illustrates an example of a sprite before transformation (pre-transformation sprite) stored in the image memory 3, while FIG. 4B shows an example of the sprite transformed and displayed on the display screen. As shown in the figures, the sprite has a rectangular shape having four apexes. Hereinafter, the four apexes are referred to as apexes A, B, C, D, as viewed from the upper left point of the pre-transformation sprite, in the counterclockwise direction.

Figure 9:
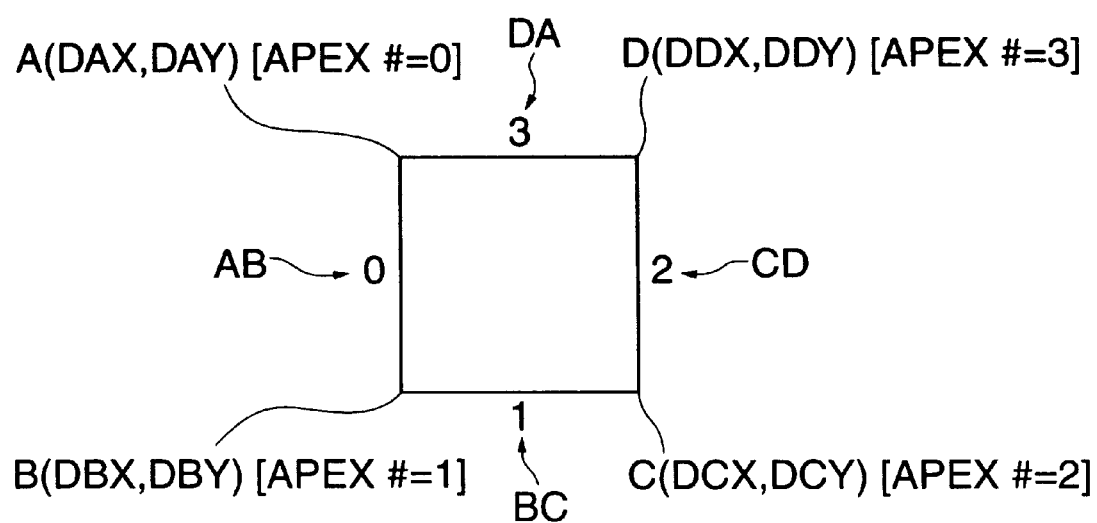
FIG. 9 is a diagram showing definitions of line numbers employed in the embodiment.

The following is an enumeration of attribute values related to the transformation of the sprite.

a. The coordinate values of the four apexes of the post-transformation sprite on the display screen:

The coordinate value (DAX, DAY) of the apex A, the coordinate value (DBX, DBY) of the apex B, the coordinate value (DCX, DCY) of the apex C, and the coordinate value (DDX, DDY) of the apex D b. The minimum value ymin of the Y coordinate values of pixels forming the post-transformation sprite:

In the example illustrated in FIG. 4B, the Y coordinate value DDY of the apex D is the minimum value ymin.

c. The maximum value ymax of the Y coordinate values of the pixels forming the post-transformation sprite:

The Y coordinate value DBY of the apex B is the maximum value ymax in the example of FIG. 4B.

d. A number pn_min corresponding to the uppermost apex (i.e. an apex which has the smallest Y coordinate value and is the first apex to be drawn) of the four apexes of the post-transformation sprite:

In the present embodiment, an apex number "0" is assigned to the apex A, apex number "1" to the apex B, apex number "2" to the apex C, and apex number "3" to the apex D (see FIG. 9). In the example shown in FIG. 4B, out of the four apexes of the post-transformation sprite, the apex D is located at the highest position (that is, it has the smallest Y coordinate value), and hence the apex number "3" assigned to the apex D is set to the number pn_min.

e. A number pn_max corresponding to the lowermost apex (i.e. an apex which has the largest Y coordinate value and is the last apex to be drawn) of the four apexes of the post-transformation sprite:

In the example shown in FIG. 4B, out of the four apexes of the post-transformation sprite, the apex B is located at the lowest position (that is, it has the largest Y coordinate value), so that the apex number "1" assigned to the apex B is set to the number pn_max.

f. A size SZX in the X direction and a size SZY in the Y direction of the pre-transformation sprite:

What is meant by each of these sizes is obvious from FIG. 4A.

Thus, the attribute values under the items a to f are related to the transformation of the sprite in the examples of FIGS. 4A and 4B.

These attribute values are stored in the sprite attribute table 102 and updated by the CPU 1 as required.

A memory interface 104 controls transfer of image data between the VDP 100 and the image memory 3 when the VDP 100 reads out image data of desired sprites or patterns from the image memory 3, or when the VDP 100 writes images of sprites and patterns into the image memory 3. A sprite title as mentioned above is read out from the sprite attribute table 102 and supplied to the image memory 3 as address data via the memory interface 104. As a result, the image data of a sprite corresponding to the sprite title is read out from the image memory 3, and supplied to a frame buffer controller 105 via the memory interface 104.

The frame buffer controller 105 writes the sprite image data supplied as above into the frame buffer 4, and generates image data of one sprite screen view having one or more sprites arranged therein, in the frame buffer 4. In writing sprite image data, the frame buffer controller 105 refers to attribute values read out from the sprite attribute table 102, and, if required, automatically generates specific attribute values. The frame buffer controller 105 controls the write address of sprite image data and processes the image data itself in accordance with attribute values thus obtained. It should be noted that when attribute values are automatically generated, various waveforms of periodic functions stored in a function table 106 are sometimes referred to.

If the attribute values read out from the sprite attribute table 102 include sprite transformation-related attribute values, the frame buffer controller 105 carries out a sprite-drawing process including a two-dimensional rendering process, and stores sprite image data obtained by transformation of the sprite in the frame buffer 4.

Now, the principle of the sprite-drawing process including the two-dimensional rendering process executed by the VDP 100 of the present embodiment will be described with reference to FIGS. 4A and 4B.

First, in FIG. 4B, assuming that the coordinate value of a point of intersection E of a horizontal line Y=DGY with a left side of the transformed sprite is represented by (DEX, DEY), and the coordinate value of a point of intersection F of the horizontal line Y=DGY with a right side of the transformed sprite is represented by (DFX, DFY), the coordinate values of the respective intersection points are calculated by using the following equations:

$$DEY=DGY \qquad (1)$$

$$DEX=(DAX-DDX)\times(DGY-DDY)/(DAY-DDY)+DDX \qquad (2)$$

$$DFY=DGY \qquad (3)$$

$$DFX=(DBX-DCX)\times(DGY-DCY)/(DBY-DCY)+DCX \qquad (4)$$

On the other hand, if points on the pre-transformation sprite corresponding to the point E (DEX, DEY) and the point F (DFX, DFY) on the post-transformation sprite are designated by e and f, the coordinate value (SEX, SEY) of the point e and the coordinate value (SFX, SFY) of the point f are calculated by using the following equations:

$$SEY=0 \qquad (5)$$

$$SEX=(0-SZX)\times(DGY-DDY)/(DAY-DDY)+SZX \qquad (6)$$

$$SFY=SZY \qquad (7)$$

$$SFX=(0-SZX)\times(DGY-DCY)/(DBY-DCY)+SZX \qquad (8)$$

Next, the coordinate value of an arbitrary point G on the above-mentioned horizontal line of the post-transformation sprite is represented by (DGX, DGY), and the coordinate value of a point g corresponding to the point G, on the pre-transformation sprite is represented by (SGX, SGY).

Here, a ratio between the length of a line segment ef and that of a line segment eg in the pre-transformation sprite is equal to a ratio (DGX−DEX)/(DFX−DEX) between the length of a horizontal line segment EF and that of a horizontal line segment EG in the post-transformation sprite. Hence, in the pre-transformation sprite, the length of the line segment eg is equal to a value of the length of the line segment ef multiplied by the ratio (DGX−DEX)/(DFX−DEX). In the pre-transformation sprite, a Y component of a vector ef is (SFY−SEY), and a Y component of a vector eg is (SGY−SEY). In the pre-transformation sprite, a ratio (SGY−SEY)/(SFY−SEY) between the lengths of the above respective Y components is equal to the ratio (DGX−DEX)/(DFX−DEX) between the length of the line segment EG and that of the line segment EF. Further, in the pre-transformation sprite, an X component of the vector ef is (SFX−SEX), and an X component X of the vector eg is (SGX−SEX). Similarly to the ratio between the lengths of the respective Y components, a ratio (SGX−SEX)/(SFX−SEX) between the lengths of the respective X components is also equal to a ratio (DGX−DEX)/(DFX−DEX) between the length of the line segment EG and that of the line segment EF.

Therefore, the following equations can be obtained:

$$SGY=(SFY-SEY)\times(DGX-DEX)/(DFX-DEX)+SEY \qquad (9)$$

$$SGX=(SFX-SEX)\times(DGX-DEX)/(DFX-DEX)+SEX \qquad (10)$$

To sum up, it is understood that if the above equations (1) to (8) are solved with respect to an arbitrary Y coordinate value DGY, to thereby determine coordinate values DEX, DEY, DFX, DFY, SEX, SEY, SFX, and SFY, and if these coordinate values, and an X coordinate value DGX of each point G on the horizontal component EF are substituted into the equations (9) and (10), the coordinate value (SGX, SGY) of a point g corresponding to each point G can be obtained.

However, when the coordinate values (SGX, SGY) are calculated by the above method, multiplication and division are required to be repeatedly carried out, as understood from the equations (1) to (10). It is, therefore, difficult for a VDP having a low throughput to carry out such operations.

To solve the above problem, the frame buffer controller 105 of the VDP of the present embodiment utilizes a so-called DDA (digital differential analysis) algorithm, and repeatedly carries out only addition and subtraction without executing multiplication and division, thereby calculating the above values DEX, DEY, DFX, DFY, SEX, SEY, SFX, SFY, SGX, and SGY.

According to the DDA algorithm, when a straight line extending from a starting point start (xstart, ystart) to an ending point end (xend, yend) is defined in a two-dimensional coordinate system (X-Y coordinate system, in this embodiment), the coordinate values of a plurality of lattice points which correspond to X and Y coordinate values in integers and approximate the straight line are sequentially calculated, while changing the Y coordinate value of each lattice point from a value ystart to a value yend.

The DDA algorithm employed in the present embodiment depends on which is the larger between a displacement of the straight line in the X direction and a displacement of the same in the Y direction.

Figure 5A:
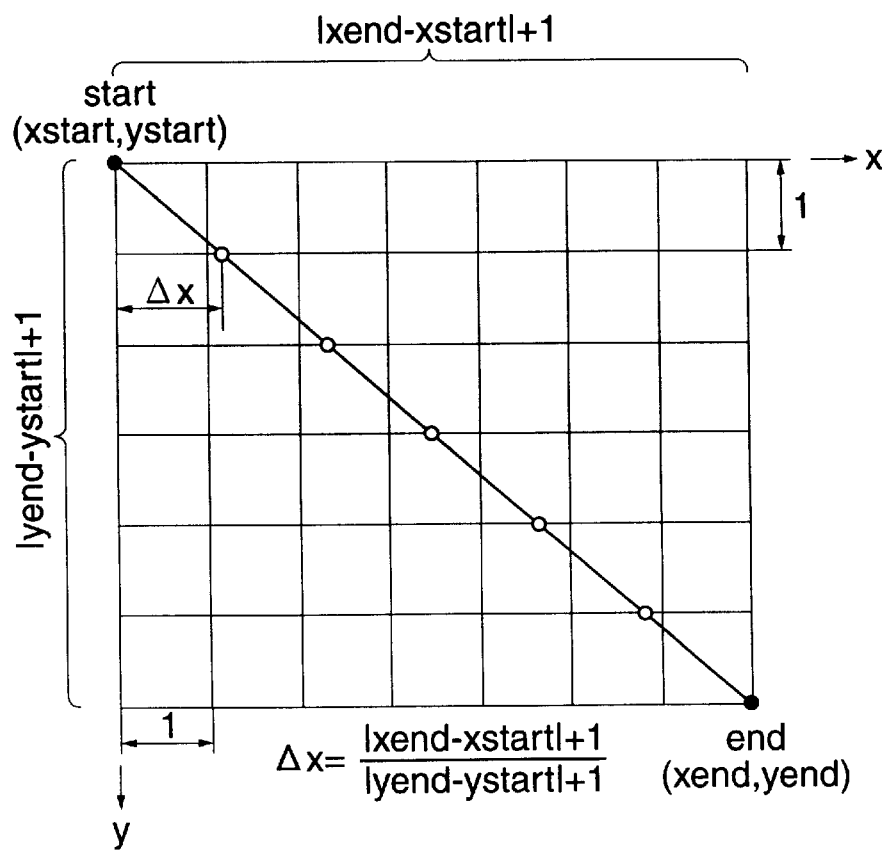
FIGS. 5A and 5B are diagrams useful in explaining the principle of a DDA algorithm employed in the embodiment.
Figure 5B:
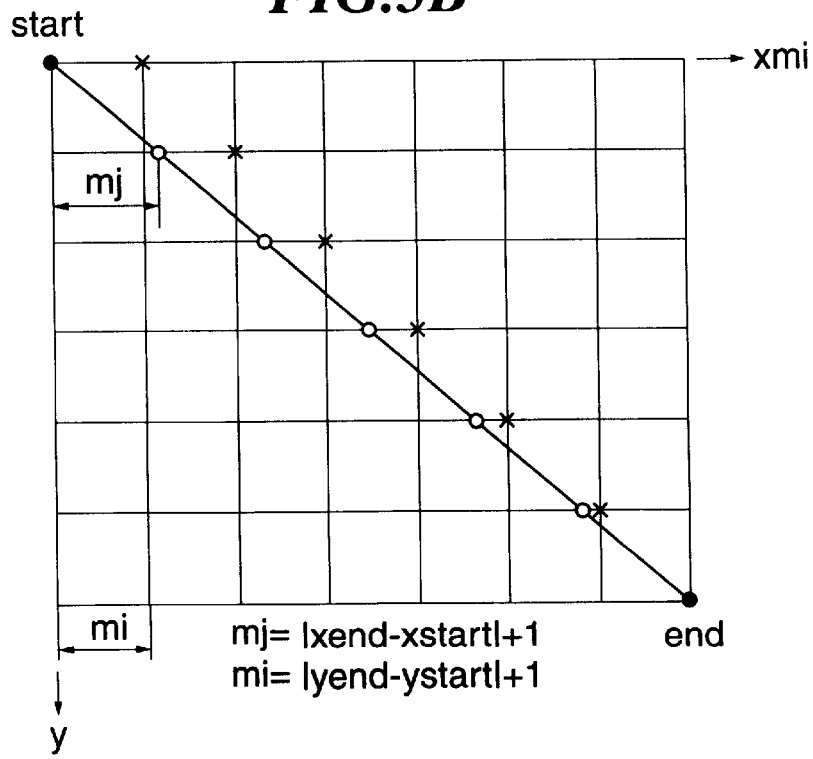

First, referring to FIGS. 5A and 5B, description is made of a calculation manner according to the DDA algorithm employed when the displacement of the straight line in the X direction is larger than the displacement of the same in the Y direction.

As shown in FIG. 5A, the straight line extending from the starting point start (xstart, ystart) to the ending point end (xend, yend) is drawn in the X-Y coordinate system. The gradient dx/dy of this straight line is calculated by the following equation:

$$dx/dy=(|xend-xstart|+1)/(|yend-ystart|+1)$$

Therefore, when a Y coordinate value is changed by "1" along the straight line appearing in FIG. 5A, the amount Δx of change in a corresponding X coordinate value is obtained by the following equation:

$$\Delta x = (dx/dy) \times 1$$
$$= (|xend - xstart| + 1)/(|yend - ystart| + 1)$$

Accordingly, if the Y coordinate value is sequentially incremented by "1" from the value ystart, and whenever the Y coordinate value is thus incremented by "1", the above amount Δx is accumulated to set a result of the accumulation to an X coordinate value, it is possible to calculate the X and Y coordinate values of each point on the straight line from the starting point start to the ending point end, that is, each point indicated by a plot "○" in FIG. 5A.

However, many of the above points on the straight line are not lattice points corresponding to X and Y coordinate values in integers.

Further, to carry out the above method, it is required to perform division to calculate the amount Δx.

To eliminate these inconveniences, the coordinate system shown in FIG. 5A is enlarged by a factor mi (=|yend−ystart|+1) in the X-axis direction.

After this enlargement is effected, a unit length "1" in the X-axis direction in FIG. 5A is enlarged to a length of the value mi (=|yend−ystart|+1) in FIG. 5B. Therefore, in FIG. 5B, a lattice point in FIG. 5A is provided every length of the value mi along the X-axis.

Further, by the above enlargement, the amount Δx in FIG. 5A is changed to a value mj in FIG. 5B, which is calculated by the following equation:

$$mj=\{(|xend-xstart|+1)/(|yend-ystart|+1)\}\times(|yend-ystart|+1)=|xend-xstart|+1$$

According to the DDA algorithm, in the two-dimensional coordinate system shown in FIG. 5B with the X coordinate axis expanded as described above, the following operations (1) to (3) are repeatedly carried out starting with initial values x=xstart, y=ystart, whereby the position of each of lattice points approximating the straight line from the starting point start to the ending point end is calculated:

(1) The value mj is accumulated;
(2) The X coordinate value is incremented by "1" to thereby carry out accumulation of the value mi. This operation is repeatedly carried out until the cumulative value of the value mi exceeds the cumulative value of the value mj; and
(3) The Y coordinate value is incremented by "1".

Plots "○" in FIG. 5B represent the results of the accumulation of mj, which correspond to the respective Y coordinate values. Further, plots "x" appearing in FIG. 5B represent Y coordinate values corresponding to respective X coordinate values at which the cumulative value of mi exceeds the cumulative value of mj by carrying out the operation (2).

Figure 6B:
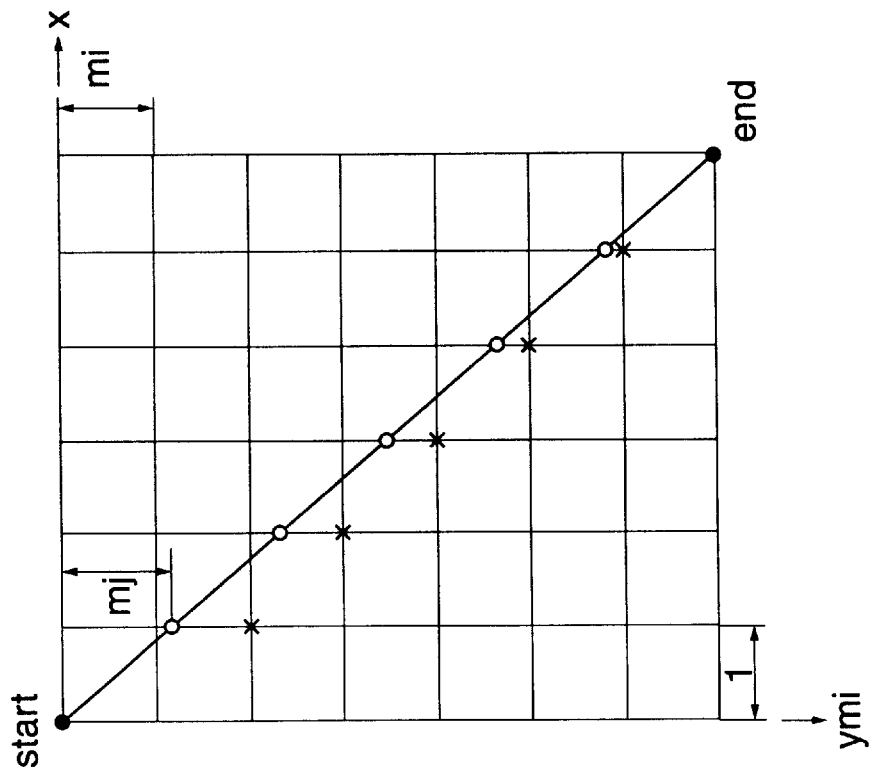
FIGS. 6A and 6B are diagrams useful in explaining the principle of another DDA algorithm employed in the embodiment.
Figure 6A:
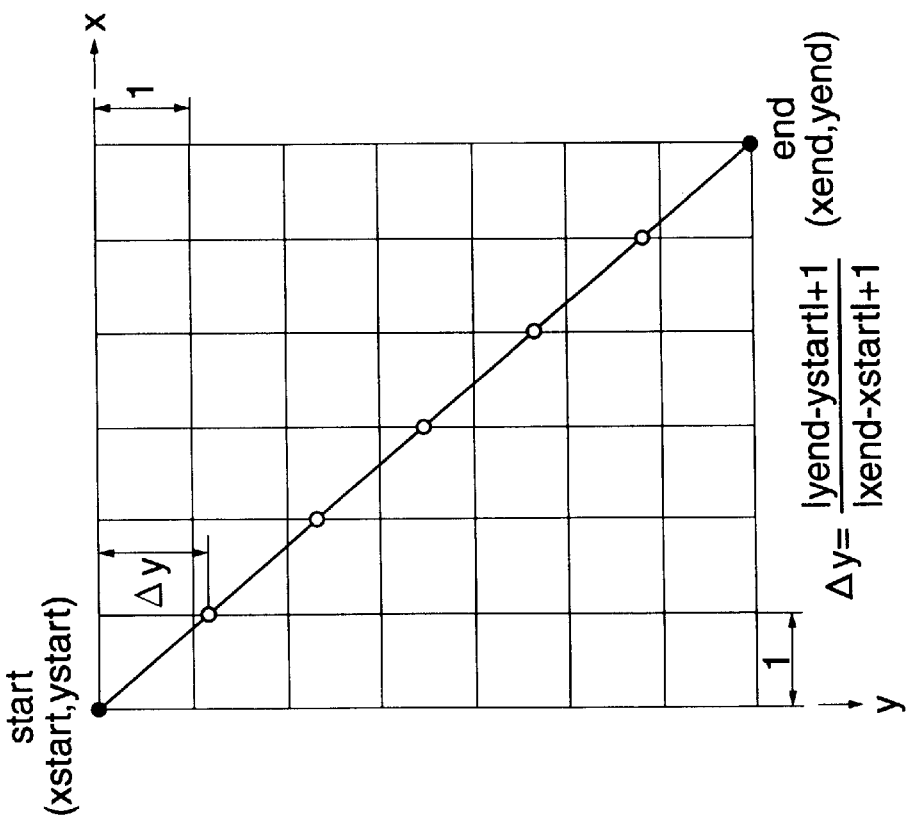

Next, referring to FIGS. 6A and 6B, description is made of a calculation manner according to the DDA algorithm employed when the displacement of the straight aline extending from the starting point start to the ending point end in the X direction is smaller than the displacement of the same in the Y direction.

As shown in FIG. 6A, the straight line extending from the starting point start (xstart, ystart) to the ending point end (xend, yend) is drawn in the X-Y coordinate system. The gradient dy/dx of the straight line is calculated by the following equation:

$$dy/dx=(|yend-ystart|+1)/(|xend-xstart|+1)$$

Therefore, when the X coordinate value is changed by "1" along the straight line shown in FIG. 6A, the amount Δy of change in a corresponding Y coordinate value is obtained by the following equation:

$$\Delta y=(dy/dx)\times 1=(|yend-ystart|+1)/(|xend-xstart|+1)$$

Accordingly, if the X coordinate value is sequentially incremented by "1" from the value xstart, and whenever the X coordinate value is thus incremented by "1", the above amount Δy is accumulated to set a result of the accumulation to a Y coordinate value, it is possible to calculate the X and Y coordinate values of each point on the straight line, that is, each point indicated by a plot "○" in FIG. 6A.

However, many of the above points on the straight line are not lattice points corresponding to X and Y coordinate values in integers.

Further, to carry out the above method, it is required to perform division to calculate the amount Δy.

To eliminate the above inconveniences, the coordinate system shown in FIG. 6A is enlarged by a factor mi (=|xend-xstart|+1) in the Y-axis direction.

After this enlargement is performed, a unit length "1" in the Y-axis direction in FIG. 6A is enlarged to a length of the value mi=(|xend-xstart|+1) in FIG. 6B. Therefore, in FIG. 6B, a lattice point in FIG. 6A is provided every length of the value mi along the Y-axis.

Further, by the above enlargement, the amount Δy in FIG. 6A is changed to a value mj in FIG. 6B, which is calculated by the following equation:

$$mj=\{(|yend-ystart|+1)/(|xend-xstart|+1)\}\times(|xend-xstart|+1)=|yend-ystart|+1$$

According to the DDA algorithm, in the two-dimensional coordinate system shown in FIG. 6B with the Y coordinate axis expanded as described above, the following operations (1) to (4) are repeatedly carried out starting with initial values x=xstart, and y=ystart, whereby the position of each of lattice points approximating the straight line from the starting point start to the ending point end is calculated:

(1) The value mi is accumulated;
(2) The value mi is accumulated;
(3) The X coordinate value is incremented by "1" when the cumulative value of the value mi exceeds the cumulative value of the value mj; and
(4) The Y coordinate value is incremented by "1".

Plots "○" in FIG. 6B represent the results of the accumulation of the value mi each of which exceeds the corresponding result of the accumulation of the value mj. Further, plots "x" appearing in FIG. 6B represent X coordinate values corresponding to respective Y coordinate values at which the result of the accumulation of the value mi exceeds the result of the accumulation of the value mj by carrying out the above operation (3).

As described above, according to the DDA algorithm, it is possible to calculate coordinate values of lattice points approximating a straight line extending from a starting point start (xstart, ystart) to an ending point end (xend, yend) in a two-dimensional coordinate system, only by repeatedly carrying out addition and subtraction without executing multiplication and division.

The frame buffer controller 105 specifies the starting point start (xstart, ystart) and the ending point end (xend, yend) of a straight line which contains the above points DEX, DEY, DFX, DFY, SEX, SEY, SFX, SFY, SGX, and SGY, and performs the DDA algorithm, thereby calculating the X and Y coordinate values of each point.

The frame buffer controller 105 carries out the sprite-drawing process including the processing based on the DDA algorithm, described above, to calculate the coordinate value (SGX, SGY) of a point g on a pre-transformation sprite (source sprite), corresponding to each point G on the horizontal scanline of the post-transformation sprite (transformed sprite), and reads out image data corresponding to the coordinate values from the image memory 3, to store the image data in the frame buffer 4. By carrying out the sprite-drawing process describe above, the image data of the transformed sprite is stored in the frame buffer 4.

When image data of one sprite screen view is written into the frame buffer 4, the frame buffer controller 105 reads out the image data for the sprite screen view from the frame buffer 4, and supplies the same to a display data controller 108. In this embodiment, the generation of the above image data and supply of the same to the display data controller 108 by the frame buffer controller 105 is carried out on a frame-by-frame basis.

A memory address generator 107 generates read addresses of image data of patterns forming a background image, for reading out the image data from the image memory 3, and sends the read addresses to the memory interface 104. The memory interface 104 supplies the read addresses to the image memory 3, and supplies the image data of patterns read out from the image memory 3, to the display data controller 108.

The display data controller 108 forms background image data by using the image data of patterns read out from the image memory 3 by the memory address generator 107. Further, the display data controller 108 writes image data of a sprite screen view read out from the frame buffer 4, over the background image data thus obtained, thereby generating image data to be displayed on a display screen. The image data thus produced is supplied to the display device 2 as a digital image signal DRGB without being further processed, or after being converted to an analog image signal RGB by a D/A converter 109.

A CPU interface 110 controls transfer of information between the CPU 1 and component parts of the VDP 100. For instance, the CPU 1 is capable of updating attribute values corresponding to a desired sprite in the sprite attribute table 102 via the CPU interface 110.

The foregoing is a detailed description of the VDP 100 according to the present embodiment.

B. Operation of Present Embodiment

Now, the operation of the present embodiment will be described by referring to an example in which a sprite is displayed as shown in FIG. 4B.

Figure 7A:
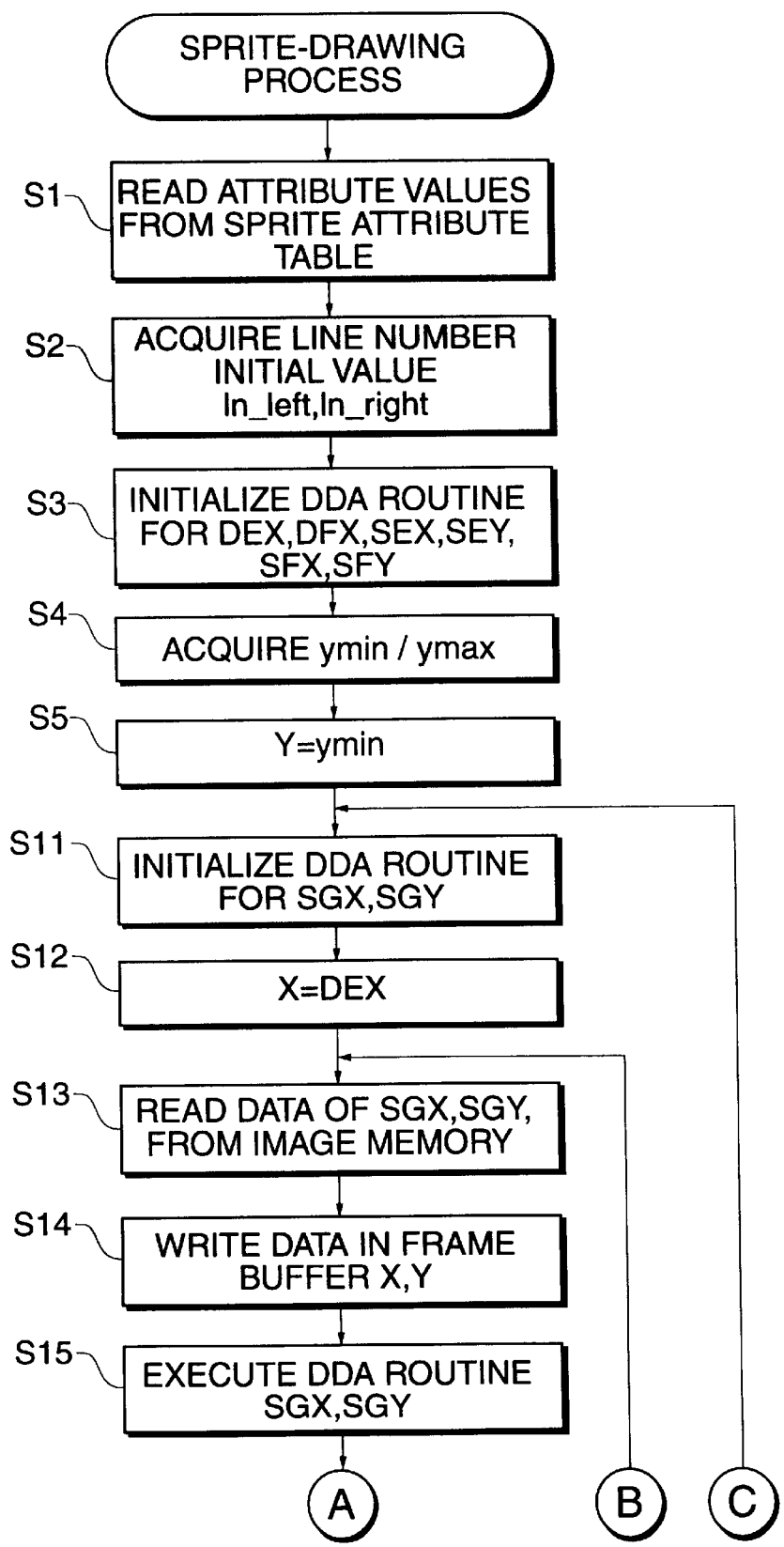
FIGS. 7A and 7B are flowcharts showing the sprite-drawing process executed by the FIG. 3 VDP.
Figure 7B:
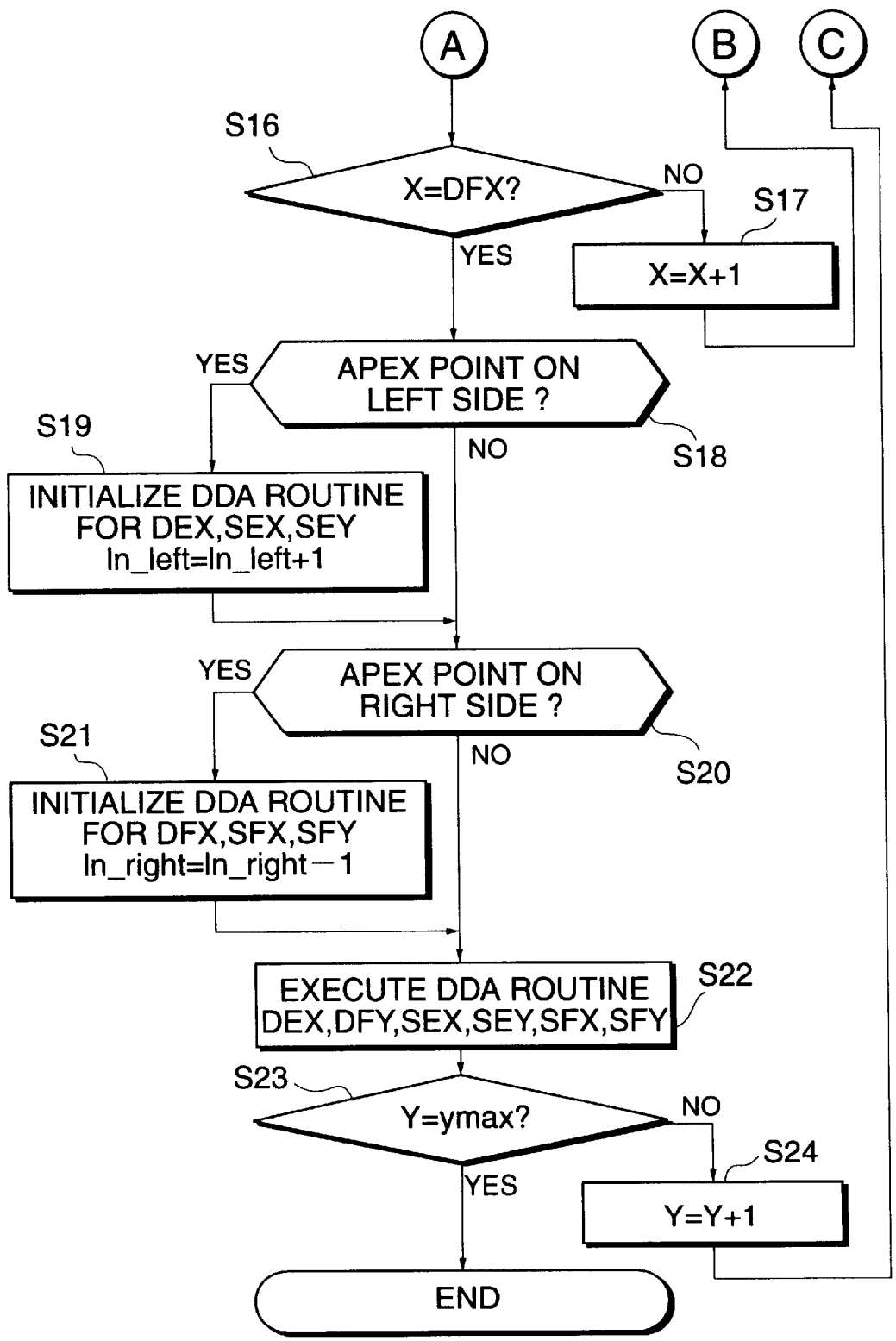

As described hereinabove, in the present embodiment, a sprite screen view is formed by storing image data of a sprite in the frame buffer 4 by the frame buffer controller 105. In the course of this process, if the sprite is to be transformed, a sprite-drawing process whose flow is shown in FIGS. 7A and 7B is executed by the frame buffer controller 105.

In the sprite-drawing process, first, at a step S1, the frame buffer controller 105 obtains the attribute values of a relevant sprite from the sprite attribute table 102.

Next, at a step S2, the frame buffer controller 105 executes a routine for acquiring line number initial value, the flow of which is shown in FIG. 8. This routine is carried out to determine two sides of a transformed sprite, with which the horizontal scanline first intersects when it is shifted downward.

In this line number initial value-acquiring routine, first, the frame buffer controller 105 determines at a step S101 which of the apex numbers "0" to "3" is set to the attribute value pn_min, that is, which of the apexes A to D is the uppermost apex of the transformed sprite. As shown in FIG. 4B, if the apex D is the uppermost apex of the transformed sprite, pn_min="3" holds, and hence the program proceeds from the step S101 to a step S140 to execute a subroutine at steps S140 to S144.

At the steps S140 to S144, a line number-setting process is carried out for setting a line number corresponding to the uppermost apex determined at the step S101. Next, the line number-setting process will be described in detail.

First, in the present embodiment, as shown in FIG. 9, line numbers "0" to "3" are assigned to respective sides AB, BC, CD, and DA of the sprite.

When the apex D is the uppermost apex of the transformed sprite, normally, as shown in FIG. 10D(d), on a left side of the apex D is the side DA (line number "3"), and on a right side thereof is the side CD (line number "2"). Therefore, when the horizontal scanline is moved downward, it first intersects with the sides DA and CD after passing the apex D.

Therefore, at the step S140, out of the first two sides with which the horizontal scanline intersects, the line number ln_left of the side on the left side of the apex D is set to "3", and the line number ln_right of the side on the right side of the apex D is set to "2".

Now, as shown in FIG. 10D(a1), there is a case where the apex D and the apex A of the transformed sprite are positioned on the same horizontal scanline to make the Y coordinate values DAY and DDY equal to each other. In such a case, the first two sides that the horizontal scanline crosses after passing through the apex D are the side AB and the side CD. Therefore, at steps S141 and S142, out of the first two sides the horizontal scanline crosses, the line number In_left of the left side of the apex D is changed from "3" to "0".

Further, as shown in FIG. 10D(a2), the apex D and the apex C of the transformed sprite can be positioned on the same horizontal scanline to make the Y coordinate values DCY and DDY equal to each other. In such a case, the first two sides with which the horizontal scanline intersects after passing the apex D are the side DA and the side BC. Accordingly, at steps S143 and S144, out of the first two sides with which the horizontal scanline intersects, the line number ln_right of the right side of the apex D is changed from "2" to "1".

The foregoing is a detailed description of the line number-setting process (steps S140 to S144) executed when the apex D is the uppermost apex of the transformed sprite.

This holds true with other cases. When the apex A is the uppermost apex of the transformed sprite, a line number-setting process at steps S110 to S114 is executed, and when the apex B is the uppermost apex, a line number-setting process at steps S120 to S124 is executed. Further, when the apex C is the uppermost apex, a line number-setting process at steps S130 to S134 is executed. Details of the above line number-setting processes are shown in FIGS. 10A(a0), 10A(a1), 10A(a2), 10B(a0), 10B(a1), 10B(a2), 10C(a0), 10C(a1), 10C(a2).

The foregoing is a detailed description of the line number initial value-acquiring routine carried out at the step S2 shown in FIG. 7A.

Next, at a step S3 in FIG. 7A, a DDA initialization process is executed for setting initial values before execution of a DDA algorithm-based process.

In the present embodiment, at a step S22, referred to hereinafter, coordinate values, such as DEX, DFX, SEX, SEY, SFX, and SFY, are sequentially calculated by the DDA algorithm-based process, and at a step S15, described hereinafter, coordinate values, such as SGX and SGY, are sequentially calculated by the DDA algorithm-based process.

Eight subroutines corresponding to the respective coordinate values DEX, DFX, SEX, SEY, SFX, SFY, SGX and SGY are used to perform the above DDA algorithm-based process. Although these subroutines are executed by the same algorithm, they are provided for respective kinds of coordinate values, since it is required to discriminate variables used for sequential calculation of coordinate values between the coordinate values. Subroutines for performing the above DDA algorithm-based process will be described hereinafter.

In the DDA initialization process at the step S3, variables are initialized which are used in six types of DDA algorithm-based processes executed at the step S22, which correspond to the respective coordinate values DEX, DFX, SEX, SEY, SFX, and SFY.

Figure 11:
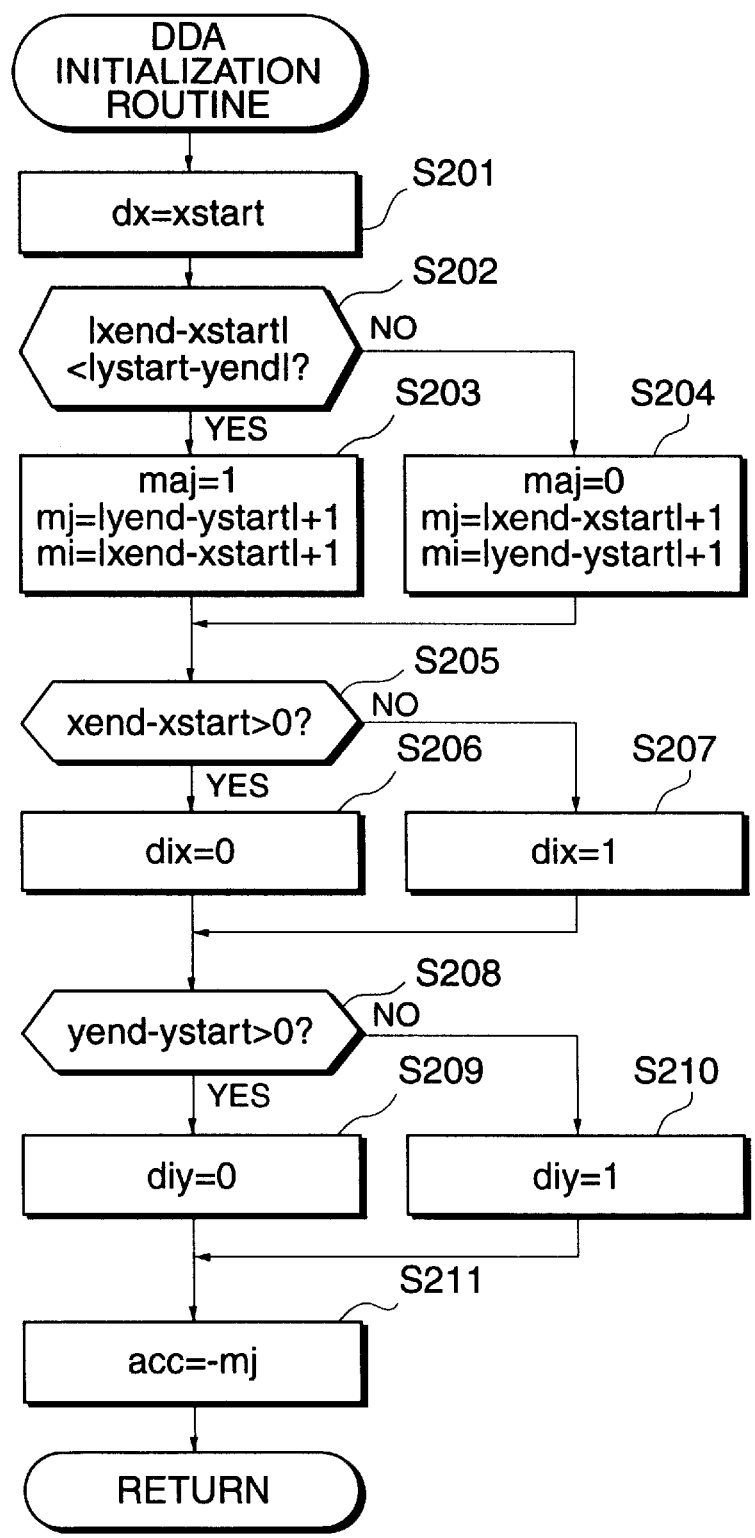
FIG. 11 is a flowchart showing a DDA initialization routine executed by the FIG. 3 VDP.
Figure 13A:
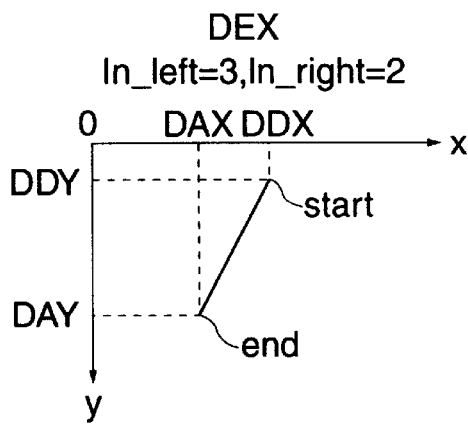
FIGS. 13A to 13F are diagrams showing conditions for the DDA initialization, which correspond to the sprites appearing in FIGS. 4A and 4B.
Figure 13D:
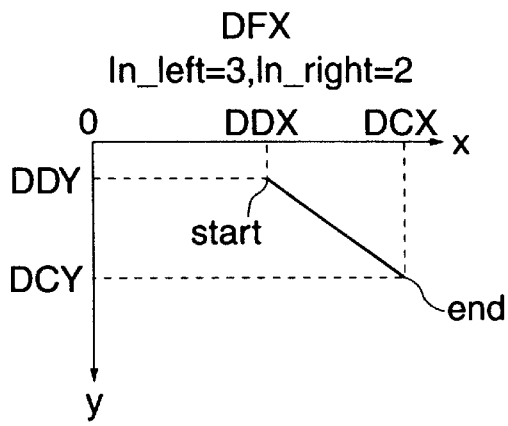
Figure 13B:
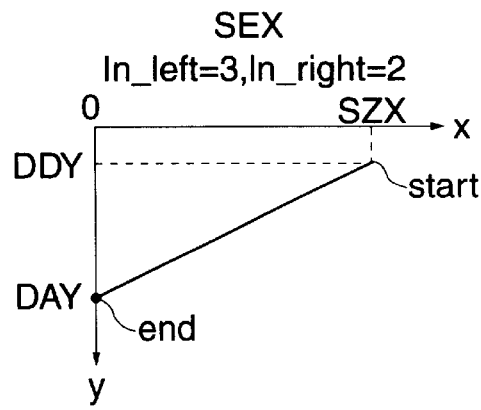
Figure 13E:
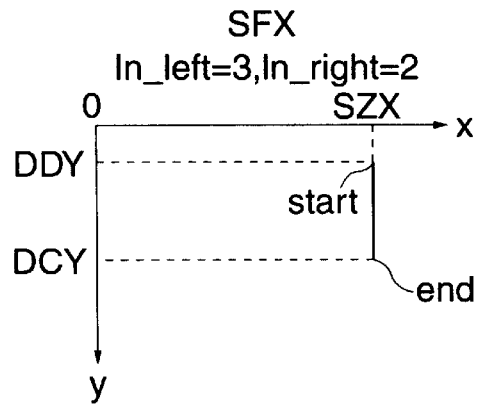
Figure 13C:
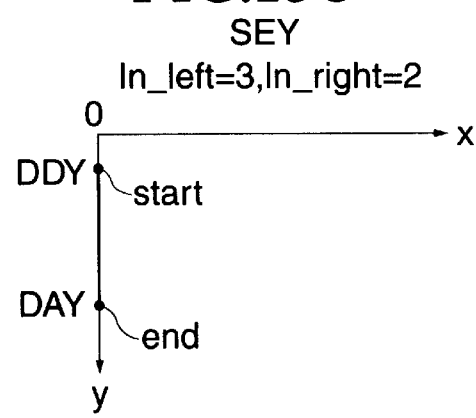
Figure 13F:
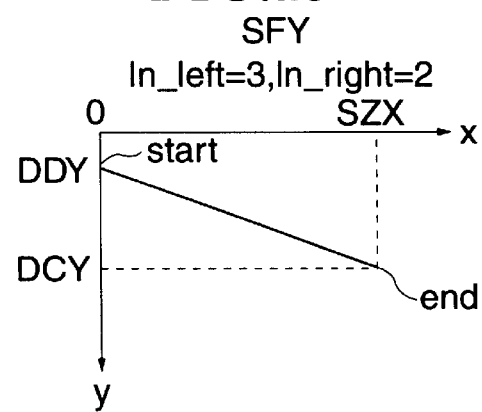

FIG. 11 is a flowchart showing a routine for performing the DDA initialization process executed at the step S3. Similarly to the subroutines for performing the DDA algorithm-based process, eight types of routines corresponding to the respective coordinate values DEX, DFX, SEX, SEY, SFX, SFY, SGX and SGY are provided for the DDA initialization process. At the step S3, six of the eight types of DDA initialization routines are executed.

To carry out each of the DDA initialization routines, it is required to provide as arguments the coordinate values xstart and ystart of a starting point start, and the coordinate values xend and yend of an ending point end. FIG. 12 shows a list of pieces of information which are given as the coordinate values xstart, ystart, xend, and yend when the DDA initialization routines corresponding to the respective coordinate values DEX, DFX, SEX, SEY, SFX, and SFY are executed at the step S3. As shown in the figure, the pieces of information given as arguments are different from each other depending on which coordinate value the DDA initialization routine corresponds to, and the values of the line numbers ln_left and ln_right. When the transformed sprite shown in FIG. 4B is drawn, the line numbers ln_left and ln_right are set to "3" and "2", respectively. Accordingly, in this case, arguments for the respective DDA initialization routines which correspond to the respective coordinate values DEX, SEX, and SEY are set in accordance with conditions shown in areas corresponding to the line number ln_left="3" in FIG. 12, while arguments for the respective DDA initialization routines which correspond to the respective coordinate values DFX, SFX, and SFY are set in accordance with conditions shown in areas corresponding to the line number ln_right="2".

FIGS. 13A to 13F each show the X and Y coordinate values of a starting point start and an ending point end which are set as arguments for the respective DDA initialization routines at the step S3, when the transformed sprite shown in FIG. 4B is drawn.

The reason why the arguments shown in FIGS. 13A to 13F are set before execution of the DDA initialization routines corresponding to the respective coordinate values DEX, DFX, SEX, SEY, SFX, and SFY at the step S3 will be described together with a description of the step S22 for performing DDA algorithm-based processes corresponding to the arguments, hereinafter given.

Next, the subroutines for the DDA initialization process shown in FIG. 11 will be described by taking a DDA initialization process corresponding to the coordinate value DEX as an example. When the transformed sprite shown in FIG. 4B is drawn, the coordinate values DDX, DDY, DAX, and DAY are set as the arguments xstart, ystart, xend, and yend (see an area FIG. 12 corresponding to DEX in the column of "ln_left="3").

The DDA initialization process corresponding to the coordinate value DEX is carried out according to the FIG. 11 flow after setting of the above arguments.

First, at a step S201, the coordinate value of the argument "start", that is, in this case, the X coordinate value DDX of the apex D in FIG. 4B is set to a variable dx as an initial value of DEX on which the DDA algorithm-based process is carried out.

Next, the program proceeds to a step S202, wherein it is determined whether or not the absolute value of the difference xend−xstart is smaller than the absolute value of the difference yend−ystart. This step S202 is carried out to determine whether or not the absolute value of a gradient of a line segment extending from a starting point (xstart, ystart) to an ending point (xend, yend) in a two-dimensional coordinate system is larger than "1".

In the case of the example shown in FIG. 4B, the gradient of the line segment extending from the starting point D to the ending point A is larger than "1", and hence the absolute value of the difference xend−xstart=DDX−DAX is smaller than the absolute value of the difference yend−ystart=DDY−DAY.

Therefore, the answer to the question of the step S202 is affirmative (Yes), and the program proceeds to a step S203. At the step S203, a flag maj is set to "1", and "1" is added to the absolute value of the difference yend−ystart (DDY−DAY, in this example) to set the resulting value to mj. Further, "1" is added to the absolute value of the difference xend−xstart (DDX−DAX, in this example) to set the resulting value to mi. The symbols mj and mi represent variables for use in carrying out the DDA algorithm-based process corresponding to DEX at the step S22, referred to hereinafter. An outline of the use of these variables or values has already been described above with reference to FIGS. 5A and 5B.

Next, the program proceeds to a step S205, where it is determined whether or not the difference xend−xstart is larger than 0, that is, whether or not the ending point (xend, yend) is located on the right side of (i.e. toward a larger X coordinate value with respect to) the starting point (xstart, ystart).

In the case of the example shown in FIG. 4B, the ending point A is located on the left side of the starting point D, so that the difference xend−xstart=DDX−DAX assumes a negative sign. Accordingly, the answer to the question of the step S205 is negative (No), and the program proceeds to a step S207, wherein a flag dix is set to "1".

Next, the program proceeds to a step S208, wherein it is determined whether or not the difference yend −ystart is larger than 0, that is, whether or not the ending point (xend, yend) is located below (i.e. toward a larger Y coordinate value with respect to) the starting point (xstart, ystart).

In the case of the example shown in FIG. 4B, the ending point A is located below the starting point D, and hence the difference yend−ystart=DAY−DDY assumes a positive sign. Accordingly, the answer to the question of the step S208 is affirmative (Yes), and the program proceeds to a step S209, wherein a flag diy is set to "0".

Next, the program proceeds to a step S211, wherein a value −mj is set to a register acc, followed by the program returning to the sprite-drawing routine shown FIG.7.

The foregoing is an example of execution of the DDA initialization process corresponding to DEX. The following is a list of the results of the initialization in the above examples:

dx=DDX (initial value of DEX to be subjected to the DDA algorithm-based process) (step S201)

maj="1" (step S203)

mj=|DAY−DDY|+1 (step S203)

mi=|DAX−DDX|+1 (step S203)

dix="1" (step S207)

diy="0" (step S209)

acc=−mj (step S211)

Although omitted in the above description of the example of execution of the DDA initialization process corresponding to DEX, initialization is carried out such that if the answer to the question of the step S202 is negative (No), initialization is carried out at a step S204 to set maj=0, mj=|xend−xstart|+1, and mi=|yend−ystart|+1, if the answer to the question of the step S205 is affirmative (Yes), initialization is carried out at a step S206 to set dix="0", and if the answer to the question of the step S208 is negative (No), initialization is carried out at a step S210 to set diy="1".

DDA initialization routines corresponding to the other coordinate values SEX, SEY, DFX, SFX, and SFY is also carried out in the same manner as the above described DDA initialization process corresponding to DEX, and they are executed after the respective corresponding arguments have been set, as shown in FIGS. 13B to 13F.

The DDA initialization routines executed as described above complete initialization of the variables dx, maj, mi, mj, acc, dix, and diy for use in the respective DDA algorithm-based processes corresponding to the respective coordinate values DEX, SEX, SEY, DFX, SFX, and SFY, carried out at the step S22, referred to hereinafter.

At this time point, the initial values (variables dx for use in the DDA initialization routines) of the coordinate values DEX, SEX, SEY, DFX, SFX, and SFY are set or determined as follows:

DEX=DDX

SEX=SZX

SEY=0

DFX=DDX

SFX=SZX

SFY=0

These initial values are transferred as the argument xstart to the DDA initialization routines corresponding to the respective coordinate values DEX, SEX, SEY, DFX, SFX, and SFY, and set to the variable dx used in the DDA initialization routines (see the step S201 in FIG. 11).

After completion of the DDA initialization process at the step S3, the program proceeds to a step S4 to execute a ymin/ymax acquisition routine whose flow is shown in FIG. 14.

Here, the symbol "ymin" represents a Y coordinate value of the horizontal scanline assumed at a time point the transformed sprite starts to be drawn, while the symbol "ymax" represents a Y coordinate value of the horizontal scanline assumed at a time point the drawing of the transformed sprite is completed. In short, the symbols ymin and ymax represent values defining a drawing range of the transformed sprite in the Y-axis direction.

As shown in FIG. 14, in this ymin/ymax acquisition routine, the Y coordinate value ymin is set according to the value of the number pn__min (steps S300 to S304), and the Y coordinate value ymax is set according to the value of the number pn__max (steps S310 to S314), as follows:

pn__min="0"__ymin=DAY
pn__min="1"__ymin=DBY
pn__min="2"__ymin=DCY
pn__min="3"__ymin=DDY
pn__max="0"__ymax=DAY
pn__max="1"__ymax=DBY
pn__max="2"__ymax=DCY
pn__max="3"__ymax=DDY From FIG. 9, it is obvious that the above settings are valid.

After the ymin/ymax acquisition routine has been completed, the program proceeds to a step 5 in FIG. 7A, wherein the Y coordinate value of the horizontal scanline which is used to read data of the transformed sprite from the image memory 3 and write the read data into the frame buffer 4 is set to the value ymin. Then, steps S11 to S23 are executed until the Y coordinate value Y becomes equal to the value ymax by incrementing the same by "1" at a step S24.

In the following, the processes at steps S11 to S23 will be described in detail.

First, at the step S11, arguments are set as shown below, for execution of DDA initialization routines corresponding to the coordinate values SGX, and SGY.

<Setting of arguments for a DDA initialization routine corresponding to SGX>
xstart=SEX
ystart=DEX
xend=SFX
yend=DFX <Setting of arguments for a DDA initialization routine corresponding to SGY>
xstart=SEY
ystart=DEX
xend=SFY
yend=DFX Here, in the case of drawing the transformed sprite shown in FIG. 4B, when the program proceeds to the step S11 for the first time after the start of the sprite-drawing process, the above value DEX and others are set as shown below, through the initialization at the step S3:

DEX=DDX
SEX=SZX
SEY=0
DFX=DDX
SFX=SZX
SFY=0

Therefore, at this time point, the arguments for the respective DDA initialization routines are set as follows:

<First setting of arguments for the DDA initialization routine corresponding to SGX>
xstart=SEX=SZX
ystart=DEX=DDX
xend=SFX=SZX
yend=DFX=DDX <First setting of arguments for the DDA initialization routine corresponding to SGY>
xstart=SEY=0
ystart=DEX=DDX
xend=SFY=SZY
yend=DFX=DDX Next, the program proceeds to a step S12 wherein a current value DEX is set to the X coordinate value of a drawing position. Here, in the case of drawing the transformed sprite shown in FIG. 4B, when the program proceeds to the step S12 for the first time after the start of the sprite-drawing process, DEX=DDX holds as a result of the initialization at the step S3. Therefore, at first, DDX is set to the X coordinate value X of the drawing position.

Then, the program proceeds to a step S13, wherein image data of a portion of the sprite to be drawn corresponding to the coordinate values SGX and SGY is read out from the image memory 3. To draw the sprite shown in FIG. 4B, when the program proceeds to the step S13 for the first time, SGX=SZX, and SGY=0 hold.

Then, the program proceeds to a step S14, wherein the image data of the portion of the sprite to be drawn corresponding to the coordinate values SGX and SGY which have been read out at the step S13 are written into the frame buffer 4 as image data corresponding to the coordinate values X and Y. When the program proceeds to the step S14 for the first time in drawing the sprite shown in FIG. 4B, image data of a point corresponding to SGX=SZX, SGY=0, that is, image data corresponding to the apex D in FIG. 4A is written into the frame buffer as the image data of a point corresponding to X=DEX=DDX, Y=ymin=DDY, that is, image data of the apex D in FIG. 4B.

Then, the program proceeds to a step S15, wherein a DDA algorithm-based process corresponding to SGX, and a DDA algorithm-based process corresponding to SGY are executed. When the program proceeds to the step S15 for the first time in drawing the sprite shown in FIG. 4B, the DDA algorithm-based processes corresponding to SGX and SGY are not executed, since the coordinate values SGX and SGY each have the value xstart equal to the value xend, and the value ystart equal to the value yend.

Next, the program proceeds to a step S16 for determining whether or not X=DFX holds. When the program proceeds to the step S16 for the first time in drawing the sprite shown in FIG. 4B, X=DEX=DFX holds. Therefore, in this case, the answer to the question of the step S16 is affirmative (Yes), and the program proceeds to a step S18.

Next, at the step S18, it is determined whether or not the point E advancing along the left side of the apex D in accordance with execution of the DDA algorithm-based process has reached an apex (apex A in the FIG. 4B example) which is the ending point of the left side. If the answer to the question of the step S18 is negative (No), the program proceeds to a step S20.

Next, at the step S20, it is determined whether or not the point F advancing along the right side of the apex D in accordance with execution of the DDA algorithm-based process has reached an apex (apex C in the FIG. 4B example) which is the ending point of the right side. If the answer to the question of the step Sis negative (No), the program proceeds to the step S22.

Figure 15:
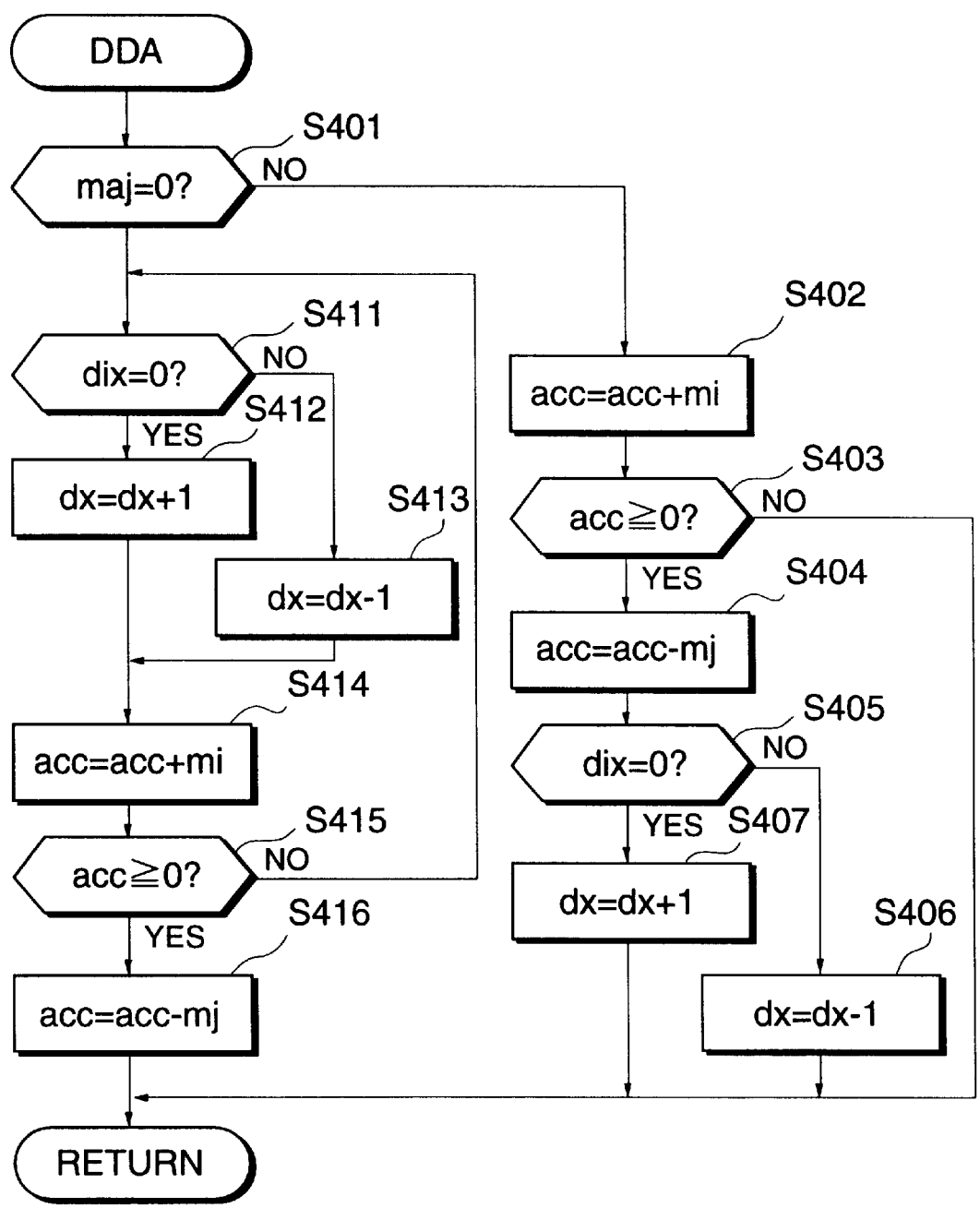
FIG. 15 is a flowchart showing a DDA processing routine executed by the FIG. 3 VDP.

At this step S22, the DDA algorithm-based process is carried out concerning each of the coordinate values DEX, DFX, SEX, SEY, SFX, and SFY. The flow of a processing routine for execution of the above DDA algorithm-based process is shown in FIG. 15.

In the DDA algorithm-based process concerning the coordinate value DEX, the X coordinate value DEX of the point E is calculated as the Y coordinate value is sequentially incremented (step S24) to thereby move the point E from the starting point D (DDX, DDY) toward the ending point A (DAX, DAY). To execute this DDA algorithm-based process, at the above-mentioned step S3, the X and Y coordinate values of the starting point D (DDX, DDY) and the ending point A (DAX, DAY) were set to the arguments xstart, ystart, xend, and yend, and then the DDA initialization routine corresponding to DEX was carried out (see FIG. 13A). By execution of the DDA initialization routine, in the case of the example shown in FIG. 5B, each variable used in the DDA algorithm-based process is initialized as follows:

dx=DDX (initial value of DEX to be subjected to the DDA algorithm-based process)
maj="1"
mj=|DAY−DDY|+1
mi=|DAX−DDX|+1
dix="1"
diy="0"
acc=−mj In the following, a routine (DDA routine) for the DDA algorithm-based process concerning the coordinate value DEX executed based on the above initialization will be described with reference to FIG. 15.

First, at step S401, it is determined whether or not maj="0" holds.

Since maj="1" holds in the present example, the answer to the question of the step S401 is negative (No), and the program proceeds to a step S402.

At the step S402, the value mi is added to the value acc and the resulting value is stored in the register acc. In short, the value mi is accumulated.

Then, the program proceeds to a step S403, wherein it is determined whether or not acc≧0 holds.

If the answer to the question of the step S403 is negative (No), the DDA routine is terminated, followed by the program returning to the sprite-drawing process shown in FIGS. 7A and 7B.

When the program returns to the sprite-drawing process, the Y coordinate value is incremented by "1" at the step S24, and after executing the steps S11 to S20, the DDA routine concerning the coordinate value DEX is executed again at the step S22.

In this case as well, maj="1" holds, and the program proceeds from the step S401 to the step S402, wherein the result of the addition of values acc and mi is stored in the register acc.

Then, it is determined at the step S403 whether or not acc ≧0 holds, and if the answer to this question is negative (No), the program returns to the sprite-drawing process.

In this way, so long as acc<0 holds, whenever the DDA routine concerning the coordinate value DEX is executed, the value mi is added to the value acc without changing the variable dx corresponding to DEX, and the Y coordinate value is incremented by "1" each time.

If acc≧0 holds during execution of the DDA routine concerning the coordinate value DEX, the answer to the question of the step S403 is affirmative (Yes), and the program proceeds to a step S404.

At the step S404, the value mj is subtrated from the value acc and the resulting value is stored in the register acc. In short, −mj is accumulated.

From the step S404, the program proceeds to a step S405, wherein it is determined whether or not dix="0" holds.

Since dix="1" holds in the present example, the answer to the question of the step S405 is negative (No), and the program proceeds to a step S406.

Next, when the program proceeds to the step S406, the variable dx corresponding to DEX is decremented by "1".

From the step S404, the program returns to the FIGS. 7A and 7B sprite-drawing process. After returning to the sprite-drawing process, the Y coordinate value is incremented by "1" at the step S24, and after execution of the steps S11 to S20, the DDA routine concerning the coordinate value DEX is again executed at the step S22.

As described hereinabove, the DDA algorithm-based process concerning the coordinate value DEX is carried out by incrementing the Y coordinate value. In this DDA routine, the value mi is added to the variable (register value) acc, and so long as acc<0 holds, the variable dx corresponding to DEX is not changed, whereas when acc≧0 holds, the value mj is subtracted from the variable acc.

Figure 16:
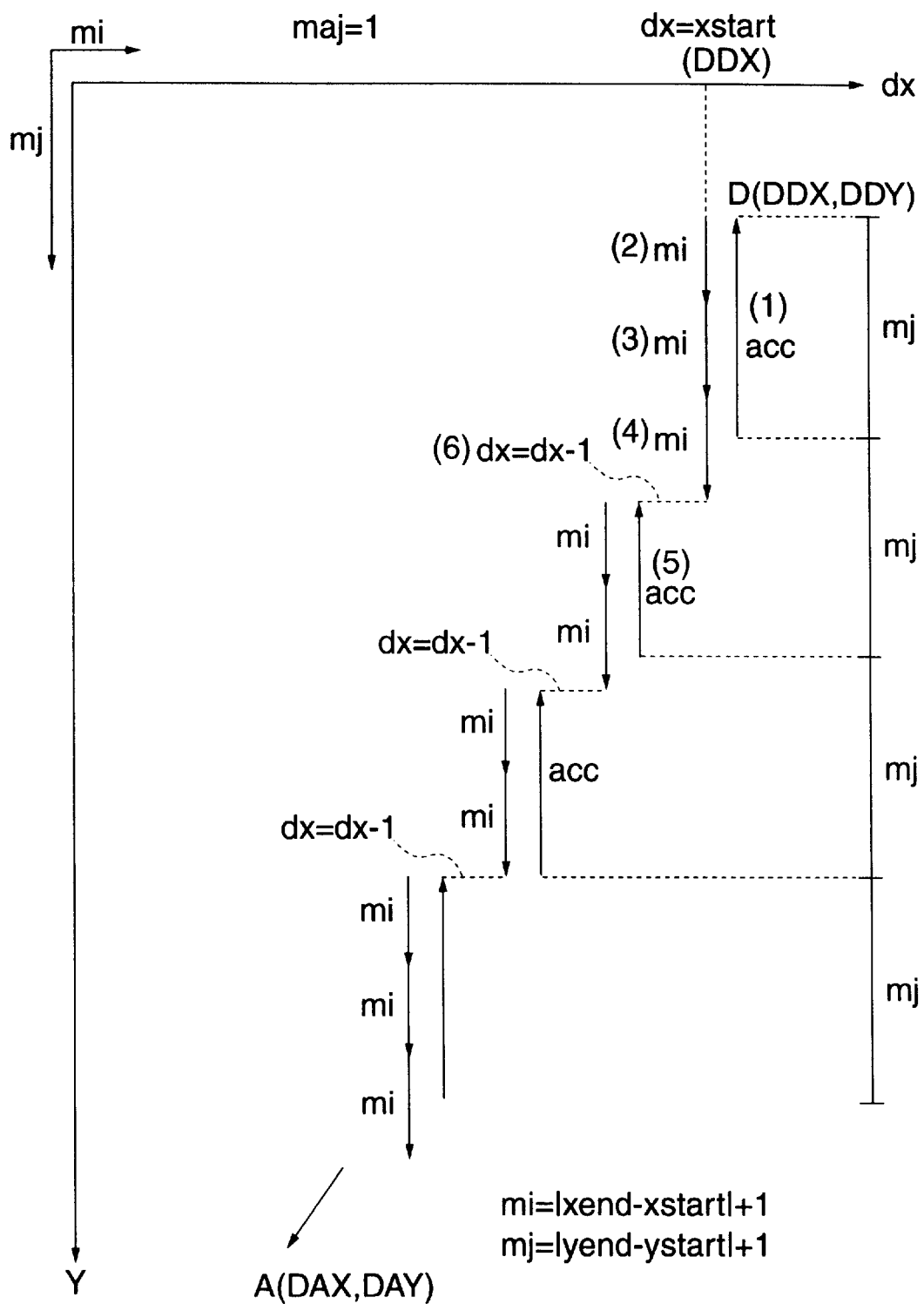
FIG. 16 is a diagram showing an example of execution of the DDA processing routine.

FIG. 16 shows an example of changes in the variables acc and dx occurring due to the execution of the DDA routine concerning the coordinate value DEX, described above. In this example, the following processes are carried out:

(1) First, the value −mj is set to the variable acc by the initialization at the step S3.

(2) Subsequently, when the program proceeds to the step S22 for the first time, the value mi is added to the variable acc by the DDA routine concerning the coordinate value DEX at the step S402, but the variable dx is not changed, since the variable acc after the addition of the value mi is still smaller than 0.

(3) When the program proceeds to the step S22 next time, the value mi is added to the variable acc by the DDA routine concerning the coordinate value DEX at the step S402, but the variable dx is not changed, since the variable acc having the value mi added thereto is smaller than 0.

(4) When the program proceeds to the step S22 next time, the value mi is added to the variable acc by the DDA routine concerning the coordinate value DEX. As a result, the variable acc after the addition of the value mi is equal to or larger than 0.

(5) Consequently, −mj is added to acc.

(6) Further, dx is decremented by "1" at the step S406.

Then, the above processes (2) to (6) are repeatedly carried out.

Thus, the DDA routine, which has already been described with reference to FIGS. 6A and 6B, is carried out, whereby as the point E is moved from the starting point D (DDX, DDY) toward the ending point A (DAX, DAY) in accordance with increment of the Y coordinate value, the X coordinate value DEX of the point E is sequentially calculated.

Next, description will be made of the DDA algorithm-based process (DDA routine) concerning the coordinate value DFX executed at the step S22. In this DDA routine concerning the coordinate value DFX, the X coordinate value DFX of the point F is calculated as the Y coordinate value is sequentially incremented (step S24) to thereby move the point F from the starting point D (DDX, DDY) toward the ending point C (DCX, DCY). To execute this DDA routine, the X and Y coordinate values of the starting point D (DDX, DDY) and the ending point C (DCX, DCY) were set to the arguments xstart, ystart, xend, and yend at the step S3 described above, and then the DDA initialization routine corresponding to DFX was carried out (see FIG. 13C). By execution of the DDA initialization routine, each variable used in the DDA routine is initialized as follows:

dx=DDX (initial value of DFX subjected to the DDA routine)
maj="0"
mi=|DCY−DDY|+1 mj=|DCX−DDX|+1
dix="0"
diy="0"
acc=−mj

In the following, the DDA routine concerning the coordinate value DFX executed based on the above initialization will be described with reference to FIG. 15.

First, at the step S401, it is determined whether or not maj="0" holds.

Since maj="0" holds in the present example, the answer to the question of the step S401 is affirmative (Yes), and the program proceeds to a step S411.

At the step S411, it is determined whether or not dix="0" holds. In the present case, dix="0" holds, and hence the answer to the question of the step S411 is affirmative (Yes), and the program proceeds to a step S412. At the step S412, the variable dx corresponding to DFX is incremented by "1". From the step S412, the program proceeds to a step S414, wherein the value mi is added to the variable acc to store the resulting value in the register acc. That is, the value mi is accumulated. From the step S414, the program proceeds to a step S415, wherein it is determined whether or not acc≧0 holds. If the answer to the question of the step S415 is negative (No), the program returns to the step S411, wherein the increment of the variable dx is carried out again (S412) to accumulate the value mi in the register acc (S414).

When acc≧0 holds so that the answer to the question of the step S415 becomes affirmative (Yes), the program proceeds to a step S416, wherein the value mj is subtracted from the variable acc, and the program returns to the FIGS. 7A and 7B sprite-drawing process. After returning to the sprite-drawing process, the Y coordinate value is incremented by "1" at the step S24, and after execution of the steps S11 to S20, the DDA routine concerning the coordinate value DFX is again executed at the step S22.

As described hereinabove, the DDA routine concerning the coordinate value DFX is carried out by incrementing the Y coordinate value. In this DDA routine, increment of the variable dx (S412), and addition of the value mi to the variable acc (S414) are carried out until acc≧0 holds. When acc ≧0 holds, the value mj is subtracted from the variable acc at the step S416.

Figure 17:
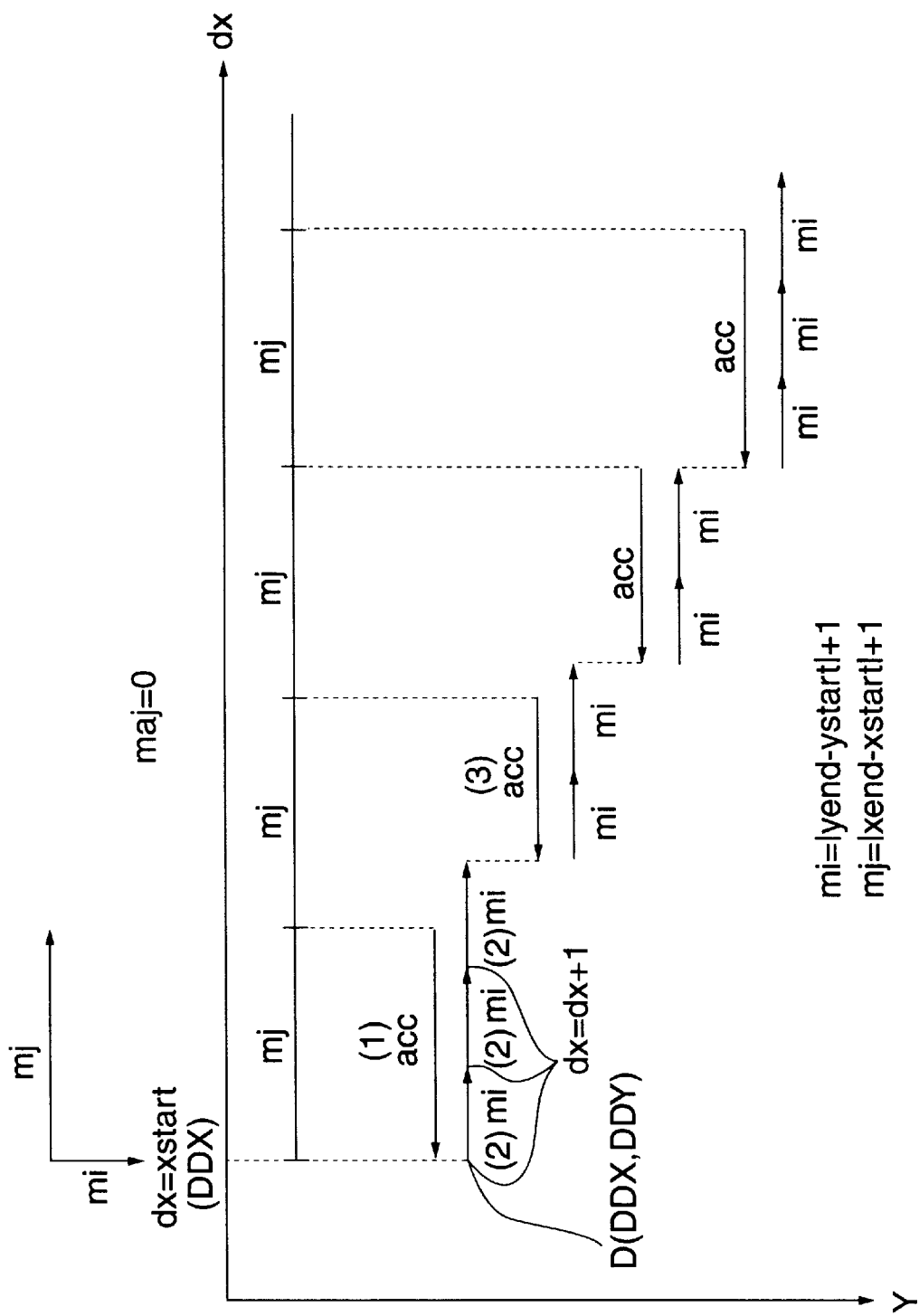
FIG. 17 is a diagram showing another example of execution of the DDA processing routine.

FIG. 17 shows an example of changes in the variables acc and dx, which occur due to the execution of the DDA routine concerning the coordinate value DFX, described above. In this example, the following processes are carried out:

(1) First, the value −mj is set to the variable acc by the initialization at the step S3.

(2) Subsequently, when the program proceeds to the step S22 first, in the DDA routine concerning the coordinate value DFX, increment of the variable dx corresponding to DFX (S412) and addition of the value mi to the variable acc (S414) are repeatedly carried out until acc≧0 holds.

(3) Then, when acc≧0 holds, the value −mj is added to the variable acc at the step S416, and the program returns to the sprite-drawing process to increment the Y coordinate value at the step S24.

Then, the above processes (2) and (3) are repeatedly carried out.

Thus, the DDA algorithm-based process, which has already been described with reference to FIGS. 5A and 5B, is carried out, and as the point F is moved from the starting point D (DDX, DDY) toward the ending point C (DCX, DCY) in accordance with increment of the Y coordinate value, the X coordinate value DFX of the point F is sequentially calculated.

Although omitted in the above description of the example of the DDA routines concerning the coordinate values DEX and DFX, if the answer to the question of the step S405 is affirmative (Yes), increment of the variable dx by "1" is carried out at a step S407, followed by the program returning to the sprite-drawing process. This is because if the answer to the question of the step S405 is affirmative (Yes), the ending point is located on the right side of the starting point, that is, toward a larger X coordinate value. Further, if the answer to the question of the step S411 is negative (No), the variable dx is incremented by "1" at a step S413, followed by the program proceeding to the step S414. This is because if the answer to the question of the step S412 is negative (No), the ending point is located on the left side of the starting point, that is, toward a smaller X coordinate value.

At the step S22 in FIG. 7B, in addition to the DDA routines concerning the coordinate values DEX and DFX described above, DDA routines concerning the coordinate values SEX, SEY, SFX, and SFY are carried out. These DDA routines are carried out in the same manner as the DDA routines concerning the coordinate values DEX and DFX, and hence detailed description thereof is omitted. Now, what are determined by the DDA routines concerning these values SEX, SEY, SFX, and SFY will be described with reference to FIGS. 4A and 4b, and FIGS. 13A to 13F.

First, in each of the DDA routines concerning the values SEX and SEY, the X coordinate value SEX of the point e on the source sprite shown in FIG. 4A is calculated as the point e is moved from the apex D toward the apex A. Here, the point e on the source sprite corresponds to the point E of the transformed sprite. Therefore, while the point E is moved from the apex D toward the apex A on the transformed sprite, also on the source sprite, the point e is moved from the apex D toward the apex A. Accordingly, in the present embodiment, while the X coordinate value DEX of the point E is sequentially calculated by the DDA routine as the point E is moved from the apex D toward the apex A on the transformed sprite, the coordinate values SEX and SEY of the point e on the source sprite are sequentially calculated by the DDA routines as the point e is moved from the apex D toward the apex A, in synchronism with the sequential calculation of the X coordinate value DEX of the point E.

Here, as to the DDA routine concerning the coordinate value SEX, the following initialization is carried out at the step S3 (see FIG. 13B):

xstart=SZX
ystart=DDY
xend=0
yend=DAY

Therefore, in the DDA routine concerning the coordinate value SEX, the variable dx=SEX is linearly varied from the value SZX to "0" [more strictly, dx=SEX is varied in a stepped manner with the lapse of time (as the number of times of executions of the DDA routine increases at the step S22), since the variable dx assumes only an integer number] during a time period over which the Y coordinate value is changed from the value ystart=DDY to the value yend=DAY.

During the time period over which the Y coordinate value is changed from the value ystart=DDY to the value yend=DAY, the X coordinate value DEX of the point E moved from the apex D toward the apex A in the transformed sprite is calculated by the above DDA algorithm-based process concerning the coordinate value DEX.

The DDA routine concerning the coordinate value SEX takes the same time period as that of the DDA routine concerning the coordinate value DEX, and is carried out within the same range of the Y coordinate value.

Therefore, when the DDA routine concerning the coordinate value DEX calculates the X coordinate value of the apex E of the transformed sprite, the DDA routine concerning the coordinate value SEX calculates the X coordinate value SEX of the point e of the source sprite, corresponding to the point E of the transformed sprite.

As to the DDA algorithm-based process concerning the coordinate value SEY, the following initialization is carried out at the step S3 (see FIG. 13C):

xstart=0
ystart=DDY
xend=0
yend=DAY

Therefore, in the DDA routine concerning the coordinate value SEY, the variable dx=SEY is not changed but maintained at "0", during the time period over which the Y coordinate value is changed from the value ystart=DDY to the value yend=DAY.

The DDA routine concerning the coordinate value SEY takes the same time period as that of the DDA routine concerning the coordinate value DEX and is carried out within the same range of the Y coordinate value.

Therefore, when the DDA routine concerning the coordinate value DEX calculates the X coordinate value of the apex E of the transformed sprite, the DDA routine concerning the coordinate value SEX always calculates the X coordinate value SEY=0 of the apex e of the source sprite, corresponding to the apex E of the transformed sprite.

Next, in each of the DDA routines concerning the values SFX and SFY, the X coordinate value SFX of the point f of the source sprite in FIG. 4A is calculated as the point f is moved from the apex D toward the apex C of the source sprite. Here, the point f of the source sprite corresponds to the point F of the transformed sprite. Therefore, while the point F is moved from the apex D toward the apex C of the transformed sprite, also on the source sprite, the point f is moved from the apex D toward the apex C. Accordingly, in the present embodiment, while the X coordinate value DFX of the point F is sequentially calculated by the DDA routine as the point F is moved from the apex D toward the apex C of the transformed sprite, the coordinate values SFX and SFY of the point f on the source sprite are sequentially calculated by the DDA routines as the point f is moved from the apex D toward the apex C, in synchronism with the sequential calculation of the X coordinate value DFX of the point F.

As to the DDA algorithm-based process concerning the coordinate value SFX, the following initialization is carried out at the step S3 (see FIG. 13E):

xstart=SZX
ystart=DDY
xend=SZX
yend=DCY

Therefore, in the DDA routine concerning the coordinate value SFX, the variable dx=SFY is not changed but maintained at the value SZX, during the time period over which the Y coordinate value is changed from the value ystart=DDY to the value yend=DCY.

The DDA routine concerning the coordinate value SFX takes the same time period as that of the DDA routine concerning the coordinate value DFX and is carried out within the same range of the Y coordinate value.

Therefore, when the DDA routine concerning the coordinate value DFX calculates the X coordinate value of the point F of the transformed sprite, the DDA routine concerning the coordinate value SFX always calculates the X coordinate value SFX=SZX of the point f of the source sprite, corresponding to the point F of the transformed sprite.

Further, as to the DDA routine concerning the coordinate value SFY, the following initialization is carried out at the step S3 (see FIG. 13F):

xstart=0
ystart=DDY
xend=SZY
yend=DCY

Therefore, in the DDA routine concerning the coordinate value SFY, the variable dx=SFY is linearly varied from "0" to the value SZY [more strictly, dx=SFY is varied in a stepped manner with the lapse of time (as the number of times of executions of the DDA routine is increased at the step S22), since the variable dx assumes only an integer value] during the time period over which the Y coordinate value is changed from the value ystart=DDY to the value yend=DCY.

During the time period over which the Y coordinate value is changed from the value ystart=DDY to the value yend=DCY, the X coordinate value DFX of the point F is calculated as the point F is moved from the apex D toward the apex A on the transformed sprite, by the above DDA routine concerning the coordinate value DFX.

The DDA routine concerning the coordinate value SFX takes the same time period as that of the DDA routine concerning the coordinate value DFX, and is carried out within the same range of the Y coordinate value.

Therefore, when the DDA routine concerning the coordinate value DFX calculates the X coordinate value of the point F of the transformed sprite, the DDA routine concerning the coordinate value SFY calculates the Y coordinate value SFY of the point f of the source sprite, corresponding to the point F of the transformed sprite.

The foregoing is details of the DDA routines concerning the coordinate values DEX, DFX, SEX, SEY, SFX, and SFY executed at the step S22.

As described hereinabove, in the sprite-drawing process, the DDA routine is repeatedly carried out at the step S22 to calculate the X coordinate values of the two intersection points E (DEX, DEY) and F (DFX, DFY) between a horizontal scanline line and two sides of the transformed sprite as the horizontal scanline line is moved downward from the point Y=ymin in FIG. 4B, and the coordinate values of points e (SEX, SEY) and f (SFX, SFY) on the source sprite, corresponding to the above two intersection points E and F, are calculated.

Then, at the step S11 of the sprite-drawing process, the following arguments are set based on the coordinate values calculated as above, to thereby carry out the DDA initialization routines corresponding to the respective coordinate values SGX and SGY.

<Setting of arguments for the DDA initialization routine corresponding to SGX> xstart=SEX
ystart=DEX
xend=SFX
yend=DFX

<Setting of arguments for the DDA initialization routine corresponding to SGY> xstart=SEY
ystart=DEX
xend=SFY
yend=DFX

At the step S15 of the sprite-drawing process, the DDA algorithm-based processes corresponding to the coordinate values SGX and SGY are carried out based on the above initializations.

First, in the DDA routine concerning the coordinate value SGX, at the steps S16 and S17, during a time period over which the X coordinate value is repeatedly changed by "1" from the value ystart=DEX to the value yend=DFX, the X coordinate value dx=SGX of the point g on the source sprite is changed from the value xstart=SEX to the value xend=SFX, whereby the X coordinate value SGX of the point g is sequentially calculated.

Further, in the DDA algorithm-based process concerning the coordinate value SGY, at the steps S16 and S17, during the time period over which the X coordinate value is repeatedly changed by "1" from the value ystart=DEX to the value yend=DFX, the Y coordinate value dx=SGY of the point g on the source sprite is changed from the value xstart=SEY to the value xend=SFY, whereby the Y coordinate value SGY of the point g is sequentially calculated.

In the sprite-drawing process, image data corresponding to the point g (SGX, SGY) of the source sprite thus obtained is read out from the image memory 3 at the step S13, and stored in the frame buffer 4 as image data corresponding to the point g of the transformed sprite at the step S14.

Now, in the sprite-drawing process, when the increment of the Y coordinate value at the step S24 makes the Y coordinate value equal to the value DCY, the X coordinate value becomes equal to the value DFX=DCX at the time point the execution of the steps S13 to S17 is completed.

Therefore, when the program proceeds from the step S16 to the step S20 via the step S18, the answer to the question of the step Sis affirmative (Yes), so that the program proceeds to a step S21. This is because the X coordinate value DCX then assumed is that of the apex C on the right side DC of the apex D.

At the step S21, after "1" is subtracted from the line number ln_right, the DDA initializations corresponding to the coordinate points DFX, SFX, and SFY are carried out according to conditions corresponding to the resulting subtracted line number ln_right, out of the conditions shown in FIG. 12, followed by the program proceeding to the step S22.

The line number ln_right was "2" before the execution of the step S21, and hence at the step S21, the line number ln_right is changed to "1" so that it corresponds to the side BC of the transformed sprite.

At the step S21, the DDA initializations corresponding to coordinate values DFX, SFX, and SFY are carried out according to the conditions corresponding to the line number ln_right="1", out of the conditions shown in FIG. 12.

After execution of the above DDA initializations, at the step S22, the X coordinate value DFX of the point F, which is moved from the apex C toward the apex B in accordance with increment of the Y coordinate value, is sequentially calculated by the DDA routine concerning the coordinate value DFX, and the coordinate values SFX and SFY of the point f in the source sprite, corresponding to the above point F of the transformed sprite, are calculated by the DDA routines concerning the respective coordinate values SFX and SFY.

Further, in the sprite-drawing process, when a further increment of the Y coordinate value makes the Y coordinate value equal to the value DAY, the X coordinate value DAX of the apex A of the FIG. 4B transformed sprite is obtained as the coordinate value DEX by the DDA routine concerning the coordinate value DEX at the step S22. Accordingly, thereafter, when the program proceeds to the step S18, the answer to the question of the step S18 is affirmative (Yes), so that the program proceeds to a step S19. This is because the coordinate value DEX at this time point is the X coordinate value of the apex A on the left side DA of the apex D.

At the step S19, the line number ln_left is incremented by "1", and the DDA initializations corresponding to the coordinate values DEX, SEX, and SEY are carried out according to conditions corresponding to the post-subtraction line number ln_left, of the conditions shown in FIG. 12, followed by the program proceeding to the step S20.

The line number ln_left was "3" before the execution of the step S19, and hence at the step S19, the line number is set to "0" (the line number next to "3" is "0", since the upper limit of the line number is "3"), which corresponds to the side AB of the transformed sprite.

At the step S19, after execution of the above increment of the line number, the DDA initializations corresponding to the coordinate values DEX, SEX, and SEY are carried out according to the conditions corresponding to the line number ln_left="0", out of the conditions shown in FIG. 12.

After the above DDA initializations are executed, at the step S22, the X coordinate value DEX of the point E, which is moved from the apex A toward the apex B in accordance with the increment of the Y coordinate value, is sequentially calculated by the DDA routine concerning the coordinate value DEX, and the coordinate values SEX and SEY of the point e on the source sprite, corresponding to the above point E of the transformed sprite, are calculated by the DDA routines concerning to the coordinate values SEX and SEY.

The above described processes are carried out with increment of the Y coordinate value, and the point g (SGX, SGY) on the source sprite, corresponding to each point (X, Y) on the transformed sprite is calculated. Then, image data corresponding to the point g on the source sprite is read out from the image memory 3, and written into the frame buffer 4 as image data corresponding to the point G (SGX, SGY) on the transformed sprite.

When Y=ymax holds, the answer to the question of the step S23 is affirmative (Yes), and the sprite-drawing process is terminated.

It goes without saying that the object of the present invention may be accomplished by supplying a storage medium in which is recorded a software program realizing the functions of the VDP 100 of the above-described embodiment to a system or apparatus, and causing a computer (CPU or MPU) of the system or apparatus to read out and execute the program stored in the storage medium.

In this case, the code of the program itself read out from the storage medium achieves the novel functions of the present invention, and the storage medium storing the program constitutes the present invention.

The storage medium for supplying the program to the system or apparatus may be in the form of a floppy disk, a hard disk, an optical memory disk, an magneto-optical disk, a CD-ROM, a CD-R (CD-Recordable), a magnetic tape, a nonvolatile memory card, or a ROM, for instance. Also, the program may be supplied from a server computer through a communication network.

It goes without saying that the present invention encompasses a case in which the functions of the illustrated embodiment are accomplished not only by executing the program read out by the computer, but also by causing an OS operating on the computer to perform a part or all of actual operations according to the instructions of the program.

Further, the present invention also encompasses a case in which the program read out from the storage medium is written in a memory provided in an expanded function board inserted in the computer, or in an expanded function unit connected to the computer, and then a CPU or the like integrated in the expanded function board or expanded function unit actually performs a part of or all of the operations, based on the instructions of the program, so as to accomplish the functions of the illustrated embodiment.

What is claimed is:

1. An image processing method of generating image data of a transformed graphic from image data of a source graphic before transformation stored in an image memory, and storing said image data of said transformed graphic into a frame buffer, the method comprising the steps of:

sequentially determining, by a first DDA algorithm-based process, horizontal coordinate values of a pair of first points of intersection where a horizontal scanline intersects with two of sides defining said transformed graphic, while advancing said horizontal scanline in a vertical direction by a unit amount;

sequentially determining, by a second DDA algorithm-based process, horizontal coordinate values and vertical coordinate values of a pair of second points of intersection on sides of said source graphic corresponding respectively to said two of said sides defining said transformed graphic, said second points of intersection corresponding respectively to said first points of intersection;

determining, by a third DDA algorithm-based process, a horizontal coordinate value and a vertical coordinate value of each of points on said source graphic corresponding to respective points on a horizontal line segment connecting between one and another of said first points and spaced from each other by said unit amount, said respective points being obtained by changing a horizontal coordinate from a horizontal coordinate value of said one of said first points to a horizontal coordinate value of said another of said first points by said unit amount, whenever said first DDA algorithm-based process and said second DDA algorithm-based process are executed; and reading out image data of a location specified by said horizontal coordinate value and said vertical coordinate value of said each of said points on said source graphic determined by said third DDA algorithm-based process, from said image memory, and writing the read out image data into said frame buffer as image data of each of said respective points on said horizontal line segment connecting between said one and said another of said first points on said transformed graphic and spaced from each other by said unit amount, wherein said first DDA algorithm-based process to said third DDA algorithm-based process are based on a DDA algorithm based process for sequentially determining one of a pair of integer coordinate values corresponding to each of straight line-approximating ones of lattice points of a two-dimensional coordinate system as a second integer coordinate value in response to inputting of a first integer coordinate value corresponding to said one of said pair of integer coordinate values, said two-dimensional coordinate system having a first coordinate axis for specifying a first coordinate value and a second coordinate axis for specifying a second coordinate value, each of said lattice points being specified by an integer as said first coordinate value and an integer as said second coordinate value, said straight line-approximating ones approximating a straight line arranged in said two-dimensional coordinate system, wherein if a first numerical value corresponding to a length of said straight line along said first coordinate axis is larger than or not smaller than a second numerical value corresponding to a length of said straight line along said second coordinate axis, said first numerical value is accumulated whenever said first integer coordinate value is changed by a unit amount, and accumulation of said second numerical value and change of said second integer coordinate value by said unit amount are repeatedly carried out to update said second integer coordinate value each time such that said second integer coordinate value becomes farther from an initial value of said second integer coordinate value corresponding to one end of said straight line and becomes closer to a final value of said second integer coordinate value corresponding to another end of said straight line until the accumulated second numerical value exceeds the accumulated first numerical value, whereas if said first numerical value corresponding to said length of said straight line along said first coordinate axis is not larger than or smaller than said second numerical value corresponding to said length of said straight line along said second coordinate axis, said second numerical value is accumulated whenever said first integer coordinate value is changed by said unit amount, and accumulation of said first numerical value and change of said second integer coordinate value by said unit amount are repeatedly carried out to update said second integer coordinate value each time such that said second integer coordinate value becomes farther from said initial value of said second integer coordinate value corresponding to said one end of said straight line and becomes closer to said final value of said second integer coordinate value corresponding to said another end of said straight line until the accumulated first numerical value exceeds the accumulated second numerical value.

2. An image processing method of generating image data of a transformed graphic from image data of a source graphic before transformation from an image memory, and storing said image data of said transformed graphic into a frame buffer, the method executing a DDA algorithm-based process for sequentially determining one of a pair of integer coordinate values corresponding to each of straight line-approximating ones of lattice points of a two-dimensional coordinate system as a second integer coordinate value in response to inputting of a first integer coordinate value corresponding to said one of said pair of integer coordinate values, said two-dimensional coordinate system having a first coordinate axis for specifying a first coordinate value and a second coordinate axis for specifying a second coordinate value, each of said lattice points being specified by an integer as said first coordinate value and an integer as said second coordinate value, said straight line-approximating ones approximating a straight line arranged in said two-dimensional coordinate system, wherein if a first numerical value corresponding to a length of said straight line along said first coordinate axis is larger than or not smaller than a second numerical value corresponding to a length of said straight line along said second coordinate axis, said first numerical value is accumulated whenever said first integer coordinate value is changed by a unit amount, and accumulation of said second numerical value and change of said second integer coordinate value by said unit amount are repeatedly carried out to update said second integer coordinate value each time such that said second integer coordinate value becomes farther from an initial value of said second integer coordinate value corresponding to one end of said straight line and becomes closer to a final value of said second integer coordinate value corresponding to another end of said straight line until the accumulated second numerical value exceeds the accumulated first numerical value, whereas if said first numerical value corresponding to said length of said straight line along said first coordinate axis is not larger than or smaller than said second numerical value corresponding to said length of said straight line along said second coordinate axis, said second numerical value is accumulated whenever said first integer coordinate value is changed by said unit amount, and accumulation of said first numerical value and change of said second integer coordinate value by said unit amount are repeatedly carried out to update said second integer coordinate value each time such that said second integer coordinate value becomes farther from said initial value of said second integer coordinate value corresponding to said one end of said straight line and becomes closer to said final value of said second integer coordinate value corresponding to said another end of said straight line until the accumulated first numerical value exceeds the accumulated second numerical value;

the method comprising the steps of:

executing a transformed graphic intersection coordinate value-calulating process for sequentially carrying out said DDA algorithm-based process on each of two of sides defining said transformed graphic, with which a horizontal scanline intersects when it is moved vertically, with one of two ends of said each of said two of said sides which is first reached by said horizontal scanline set to a first starting point, another of said two ends set to a first ending point, a horizontal coordinate value of said first starting point set to said initial value of said second integer coordinate value used in said DDA algorithm-based process, a horizontal coordinate value of said first ending point set to said final value of said second integer coordinate value corresponding to said another end of said straight line used in said DDA algorithm-based process, and a vertical coordinate value defining said horizontal scanline set to said first integer coordinate value used in said DDA algorithm-based process, to thereby obtain said second integer coordinate value as a horizontal coordinate value of a corresponding one of a pair of first points of intersection where said horizontal scanline intersects with said two sides;

executing a first source graphic intersection coordinate value-calculating process for sequentially carrying out said DDA algorithm-based process on one of sides defining said source graphic corresponding to said each of said two of said sides defining said transformed graphic, with a horizontal coordinate value of one end of said one of said sides defining said source graphic corresponding to said first starting point set to said initial value of said second integer coordinate value used in said DDA algorithm-based process, a horizontal coordinate value of another end of said one of said sides defining said source graphic corresponding to said first ending point set to said final value of said second integer coordinate value used in said DDA algorithm-based process, and said vertical coordinate value defining said horizontal scanline set to said first integer coordinate, to thereby obtain said second integer coordinate value as a horizontal coordinate value of a corresponding one of a pair of second points of intersection on said source graphic corresponding respectively to said pair of first points of intersection;

executing a second source graphic intersection coordinate value-calculating process for sequentially carrying out said DDA algorithm-based process on said one of said sides defining said source graphic, with a vertical coordinate value of said one end of said one of said sides defining said source graphic corresponding to said first starting point set to said initial value of said second integer coordinate value used in said DDA algorithm-based process, a vertical coordinate value of said another end of said one of said sides defining said source graphic corresponding to said first ending point set to said final value of said second integer coordinate value used in said DDA algorithm-based process, and said vertical coordinate value defining said horizontal scanline set to said first integer coordinate value, to thereby obtain said second integer coordinate value as a vertical coordinate value of said corresponding one of said pair of second points of intersection on said source graphic corresponding respectively to said pair of first points of intersection;

executing a horizontal coordinate value-calculating process for repeatedly carrying out said DDA algorithm-based process whenever said transformed graphic coordinate value-calculating process, said first source graphic coordinate value-calculating process, and said second source graphic coordinate value-calculating process are carried out one time, with a horizontal coordinate value of one of said pair of second points of intersection corresponding to one of said two sides defining said transformed graphic set to said initial value of said second integer coordinate value used in said DDA algorithm-based process, a horizontal coordinate value of another of said pair of second points of intersection corresponding to another of said two sides defining said transformed graphic set to said final value of said second integer coordinate value, and each of integer horizontal coordinate values on a horizontal line segment connecting between said pair of first points of intersection on said two sides defining said transformed graphic set to said first integer coordinate value used in said DDA algorithm-based process, to thereby obtain said second integer coordinate value as a horizontal coordinate value of each of points on said source graphic corresponding to respective points on said horizontal line segment spaced from each other by said unit amount;

executing a vertical coordinate value-calculating process for repeatedly carrying out said DDA algorithm-based process whenever said transformed graphic coordinate value-calculating process, said first source graphic coordinate value-calculating process, and said second source graphic coordinate value-calculating process are carried out one time, with a vertical coordinate value of said one of said pair of second points of intersection corresponding to said one of said two sides defining said transformed graphic set to said initial value of said second integer coordinate value used in said DDA algorithm-based process, a vertical coordinate value of said another of said pair of second points of intersection corresponding to said another of said two sides defining said transformed graphic set to said final value of said second integer coordinate value, and said each of integer horizontal coordinate values on said horizontal line segment connecting between said pair of first points of intersection on said two sides defining said transformed graphic set to said first integer coordinate value used in said DDA algorithm-based process, to thereby obtain said second integer coordinate value as a vertical coordinate value of said each of said points on said source graphic corresponding to said respective points on said horizontal line segment spaced from each other by said unit amount; and reading out a portion of said image data of said source graphic from a location within said image memory specified by said horizontal coordinate value obtained by said horizontal coordinate value-calculating process and said vertical coordinate value obtained by said vertical coordinate value-calculating process, for said each of said respective points on said horizontal line segment, and storing the read out portion of said image data in said frame buffer as image data of said transformed graphic corresponding to said each of said respective points on said horizontal line segment.

* * * * *